US010601812B2

(12) United States Patent
Zucker

(10) Patent No.: US 10,601,812 B2
(45) Date of Patent: *Mar. 24, 2020

(54) FACILITATING ACCESS TO PROTECTED CONTENT BY COMMONLY OWNED DEVICES OF A USER

(71) Applicant: Advanced Messaging Technologies, Inc., Hollywood, CA (US)

(72) Inventor: Adam Zucker, Encino, CA (US)

(73) Assignee: ADVANCED MESSAGING TECHNOLOGIES, INC., Hollywood, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/608,268

(22) Filed: May 30, 2017

(65) Prior Publication Data

US 2017/0324727 A1 Nov. 9, 2017

Related U.S. Application Data

(60) Continuation of application No. 14/963,042, filed on Dec. 8, 2015, now Pat. No. 9,699,174, which is a
(Continued)

(51) Int. Cl.
*H04L 29/06* (2006.01)
*H04W 12/00* (2009.01)
(Continued)

(52) U.S. Cl.
CPC ............ *H04L 63/083* (2013.01); *H04L 63/06* (2013.01); *H04W 12/003* (2019.01);
(Continued)

(58) Field of Classification Search
CPC ..... H04L 63/00; H04L 63/04; H04L 63/0428; H04L 63/0435; H04L 63/06–062;
(Continued)

(56) References Cited

U.S. PATENT DOCUMENTS 7,047,088 B2  5/2006  Nakamura et al.
7,421,484 B2  9/2008  Das
(Continued)

FOREIGN PATENT DOCUMENTS

CN       1867198 A    11/2006
CN   101668290 A     3/2010
(Continued)

OTHER PUBLICATIONS

PCT International Search Report and Written Opinion (dated Aug. 30, 2013), International Application No. PCT/US2013/047017, International Filing Date—Jun. 21, 2013, 14 pages.
(Continued)

*Primary Examiner* — Eric W Shepperd
(74) *Attorney, Agent, or Firm* — Womble Bond Dickinson (US) LLP

(57) ABSTRACT

A system and method for transmitting user credentials to another device. According to some embodiments, a method is described of receiving into a first portable electronic device a set of credentials from a user, the set of credentials to include a WLAN SSID and a network key, the set of credentials to allow the first device to connect to the WLAN. The set of credentials is used to connect the first device to the WLAN. The first device creates a message for wireless transmission, the message includes the set of credentials for accessing the WLAN and is adapted to be delivered to a second device. Finally, the first device transmits the message over the air, wherein the message is addressed to the second device. The second device receives the message and uses the credentials in the message to connect to the WLAN. Other embodiments are also described.

16 Claims, 14 Drawing Sheets

Related U.S. Application Data division of application No. 13/534,936, filed on Jun. 27, 2012, now Pat. No. 9,258,704.

(51) Int. Cl.
*H04W 12/06* (2009.01)
*H04W 12/04* (2009.01)
*H04W 84/12* (2009.01)

(52) U.S. Cl.
CPC ........... *H04W 12/04* (2013.01); *H04W 12/06* (2013.01); *H04L 63/18* (2013.01); *H04W 84/12* (2013.01)

(58) Field of Classification Search
CPC ... H04L 63/065; H04L 63/08; H04L 63/0823; H04L 29/06551; H04L 29/06707; H04L 29/06721; H04L 29/06755; H04L 29/06775; H04L 29/06823; H04W 12/00; H04W 12/04; H04W 12/08
See application file for complete search history.

(56) References Cited

U.S. PATENT DOCUMENTS

| | | | |
|---|---|---|---|
| 7,832,000 B2 | 11/2010 | Anderson | |
| 7,917,942 B2 | 3/2011 | Costa-Requena et al. | |
| 8,817,642 B2 | 8/2014 | Donaldson | |
| 9,563,757 B1* | 2/2017 | Boyer | G06F 21/6245 |
| 2002/0026442 A1* | 2/2002 | Lipscomb | H04N 7/17318 |
| 2003/0005290 A1* | 1/2003 | Fishman | G06F 21/31 |
| | | | 713/156 |
| 2003/0068046 A1 | 4/2003 | Lindqvist et al. | |
| 2004/0111520 A1 | 6/2004 | Krantz et al. | |
| 2004/0162787 A1 | 8/2004 | Madison et al. | |
| 2004/0230663 A1* | 11/2004 | Ackerman | H04N 1/00132 |
| | | | 709/207 |
| 2004/0236939 A1 | 11/2004 | Watanabe et al. | |
| 2004/0268120 A1* | 12/2004 | Mirtal | G06F 21/10 |
| | | | 713/156 |
| 2005/0113067 A1 | 5/2005 | Marcovici et al. | |
| 2005/0198233 A1 | 9/2005 | Manchester et al. | |
| 2005/0201393 A1 | 9/2005 | Hatayama et al. | |
| 2005/0246752 A1* | 11/2005 | Liwerant | G06Q 30/02 |
| | | | 725/109 |
| 2005/0266826 A1 | 12/2005 | Vlad | |
| 2005/0266835 A1 | 12/2005 | Agrawal et al. | |
| 2005/0288949 A1* | 12/2005 | Holbrook | G06Q 10/10 |
| | | | 434/107 |
| 2006/0106933 A1 | 5/2006 | Huang et al. | |
| 2006/0115089 A1 | 6/2006 | Carter et al. | |
| 2006/0116166 A1 | 6/2006 | Hibino | |
| 2006/0168167 A1 | 7/2006 | Kushalnagar et al. | |
| 2006/0199536 A1 | 9/2006 | Eisenbach | |
| 2006/0251256 A1* | 11/2006 | Asokan | H04L 63/065 |
| | | | 380/270 |
| 2007/0143391 A1 | 6/2007 | Nakamura | |
| 2007/0254630 A1 | 11/2007 | Moloney et al. | |
| 2008/0147831 A1 | 6/2008 | Redjaian et al. | |
| 2008/0175187 A1 | 7/2008 | Lowry | |
| 2008/0181187 A1 | 7/2008 | Scott et al. | |
| 2008/0298375 A1 | 12/2008 | Agardh et al. | |
| 2009/0061769 A1* | 3/2009 | Zimbric | H04M 1/7253 |
| | | | 455/41.2 |
| 2009/0073923 A1 | 3/2009 | Homma | |
| 2009/0197575 A1* | 8/2009 | Degraeve | H04L 29/1216 |
| | | | 455/412.1 |
| 2010/0087164 A1 | 4/2010 | Ritzau et al. | |
| 2010/0124213 A1 | 5/2010 | Ise et al. | |
| 2010/0253507 A1* | 10/2010 | Jung | H04M 1/7253 |
| | | | 340/539.13 |
| 2010/0313250 A1 | 12/2010 | Chow | |
| 2011/0028085 A1 | 2/2011 | Waung et al. | |
| 2011/0126271 A1 | 5/2011 | Kim et al. | |
| 2011/0131633 A1* | 6/2011 | MacAskill | G06F 21/6209 |
| | | | 726/4 |
| 2011/0275316 A1 | 11/2011 | Suumaki et al. | |
| 2011/0312307 A1* | 12/2011 | Gross | H04L 51/14 |
| | | | 455/414.1 |
| 2012/0066277 A1* | 3/2012 | Ubukata | G06F 16/125 |
| | | | 707/827 |
| 2012/0083669 A1* | 4/2012 | Abujbara | G06F 19/3475 |
| | | | 600/300 |
| 2012/0170559 A1 | 7/2012 | Feinberg et al. | |
| 2012/0257543 A1 | 10/2012 | Baum et al. | |
| 2012/0284374 A1 | 11/2012 | Deutsch et al. | |
| 2012/0322376 A1* | 12/2012 | Couse | H04M 1/7253 |
| | | | 455/41.2 |
| 2012/0324556 A1* | 12/2012 | Yefimov | H04W 12/06 |
| | | | 726/7 |
| 2013/0208891 A1 | 8/2013 | Kholaif et al. | |
| 2013/0210379 A1 | 8/2013 | Cloutier | |
| 2013/0263217 A1 | 10/2013 | Avital | |
| 2013/0298104 A1* | 11/2013 | Kletsky | G06F 8/70 |
| | | | 717/102 |
| 2014/0007209 A1 | 1/2014 | Zucker | |
| 2014/0122608 A1 | 5/2014 | Liu et al. | |
| 2016/0094537 A1 | 3/2016 | Zucker | |
| 2016/0099973 A1* | 4/2016 | Tipton | H04W 12/08 |
| | | | 726/1 |

FOREIGN PATENT DOCUMENTS

| | | |
|---|---|---|
| CN | 101682842 A | 3/2010 |
| CN | 102301761 A | 12/2011 |
| EP | 1487224 | 12/2004 |
| EP | 1492302 | 12/2004 |
| EP | 2867764 A1 | 5/2015 |
| JP | 2002-111679 A | 4/2002 |
| JP | 2003-304252 A | 10/2003 |
| JP | 2005-244594 A | 9/2005 |
| JP | 2008-271150 A | 11/2008 |
| JP | 2010-225143 A | 10/2010 |
| JP | 2011-160226 A | 8/2011 |
| WO | WO-2006106393 | 10/2006 |
| WO | WO-2010038114 | 4/2010 |
| WO | WO-2010151692 | 12/2010 |
| WO | WO-2011121294 | 10/2011 |
| WO | 2014/004288 A1 | 1/2014 |

OTHER PUBLICATIONS

Non-Final Office Action (dated Nov. 4, 2014), U.S. Appl. No. 13/534,936, filed Jun. 27, 2012, First Named Inventor: Adam Zucker, 21 pages.
PCT International Preliminary Report on Patentability (dated Jan. 8, 2015), International Application No. PCT/US2013/047017, International Filing Date—Jun. 21, 2013, 10 pages.
Notice of Allowance and Fee(s) Due (dated Jun. 9, 2015), U.S. Appl. No. 13/534,936, filed Jun. 27, 2012, First Named Inventor: Adam Zucker, 11 pages.
CA Office Action (dated Feb. 8, 2016), CA Application No. 2,877,875, Date Filed: Jun. 21, 2013, 4 pages.
EP Search Report (dated Jan. 26, 2016), Application No. 13808983.4, Filing Date: Jun. 21, 2013, First Named Inventor: Adam Zucker, 6.
Chinese Office Action with English Language Translation, dated Nov. 4, 2016, Chinese Application No. 201380045045.4.
U.S. Non-Final Office Action, dated Nov. 2, 2016, U.S. Appl. No. 14/963,042.
Mathews, Moffat, et al., "Evolution of Wireless Lan Security Architecture to IEEE 802.11i (WPA2)" Department of Computer Science and Software Engineering, University of Canterbury, New Zealand, 2007, Internet download at: http://scholar.google.com/scholarhl=en&lr=&q=related:W6TC4qtdsiEJ:scholar.google.com/&um=1&ie=UTF-8&sa=X&ei=5XjbT5XvH4GA2wXz6IXKCA, 6 pages.
Notice of Allowance and Fees Due (PTOL-85) dated Feb. 27, 2017 for U.S. Appl. No. 14/963,042.

(56) References Cited

OTHER PUBLICATIONS

Notice of Allowance and Fees Due (PTOL-85) dated Aug. 13, 2015 for U.S. Appl. No. 13/534,936.
English Translation of JP Office Action dated Mar. 6, 2018 for JP Application No. 2015520328.
English Translation of JP Office Action dated Feb. 7, 2017 for JP Application No. 2015520328.
English Translation of CN Office Action dated Aug. 11, 2017 for CN Application No. 201380045045.
European Examination Report dated Sep. 10, 2018, for related European Patent Appln. No. 13808983.4, 4 Pages.
Japanese Office Action dated May 14, 2019 for related Japanese Appln. No. 2018-128052 3 Pages.
Korean Office Action dated Jun. 12, 2019 for related Korean Appln. No. 10-2015-7001831 5 Pages.
Japanese Office Action dated Jun. 25, 2019 for related Japanese Appln. No. JP2015-520328 5 Pages.
Korean Office Action dated Aug. 30, 2019 for related Korean Appln. No. 10-2019-7023513 5 Pages.
Translation of Japanese Notice of the Reason for Refusal dated Nov. 26, 2019, Japanese Application No. 2015-520328.
Korean Notice of Office Action with English translation dated Dec. 31, 2019, Korean Application No. 10-2015-7001831, 9 pages.

\* cited by examiner

FACILITATING ACCESS TO PROTECTED CONTENT BY COMMONLY OWNED DEVICES OF A USER

This application is a continuation of U.S. application Ser. No. 14/963,042, filed Dec. 8, 2015, which is a divisional application of the earlier filing date of U.S. application Ser. No. 13/534,936 filed Jun. 27, 2012.

FIELD

Embodiments of the present invention relate generally to portable electronic devices capable of accessing wireless local area networks (WLANs).

BACKGROUND

The ubiquitous Internet is typically accessible via a modem through an Internet service provider. For the typical user to access the Internet on a home computer, the user's home computer is conventionally coupled to a router and the router is coupled to the modem. The router passes data between a user's computer and the modem; accordingly, a typical user can connect to the Internet.

More commonly, individuals desire to connect to the Internet wirelessly so that their devices are not physically connected to a router. To realize this, a wireless network can be created that allows a user's device to wirelessly connect to a router through a wireless access point. Thus, the wireless access point creates a wireless network (e.g., wireless local area network) for accessing the Internet.

Often times, larger establishments (e.g., hotels, restaurants, etc.) accommodating a number of diverse patrons provide those patrons with Internet access through a wireless network. However, such establishments typically wish to limit wireless access to their own patrons while restricting access from freeloaders. Accordingly, many of these wireless networks implement some method of security (e.g., wired equivalent privacy) that renders the network inaccessible without a password or network key, for example. In this way, a proprietor of the establishment providing the wireless network may supply a password or network key to those patrons of the establishment. A patron receiving the password or network key can then access the establishment's wireless network, and thereby access the Internet, by using the password or network key at the user's device. For example, a user may have a laptop computer at which the user selects the establishment's wireless network and subsequently types in the provided network key. A similar process may be performed by users of smart phones, tablet computers, and other similar devices capable of wirelessly accessing the Internet.

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one.

DETAILED DESCRIPTION

Several embodiments of the invention with reference to the appended drawings are now explained. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present invention.

An embodiment of this invention is directed to allowing multiple commonly owned portable devices to access a wireless network, by receiving the network's credentials as input at one commonly owned device and that device subsequently transmitting the network credentials to a second commonly owned device. Embodiments described herein refer to a wireless local area network (e.g., in accordance with IEEE 802.11, Wi-Fi), but it is understood that embodiments described in this Specification are applicable to analogous wireless networks having different coverage areas such as Worldwide Interoperability for Microwave Access (WiMax) networks. In the simplest embodiment, one initiating portable electronic device (e.g., a Smartphone or tablet computer) receives the WLAN credentials via user input. This initiating device then accesses the WLAN, using those credentials. Subsequently, a process running in the initiating device completes preparation of a message that includes the WLAN credentials. This "credentials message" is transmitted by the process, preferably over the air, to at least one other commonly owned device (e.g., a laptop) referred to here as a supplemental portable electronic device. Transmission can occur through a wireless personal area network (WPAN), a cellular network, or a combination of a WLAN and a cellular network. It is understood that transmission between the two commonly owned devices can be realized through any type between the two devices, such as through a point-to-point network (e.g., near field communication network). A process running in the supplemental device obtains the received message and then extracts the network credentials from the received message, and uses the extracted credentials to identify or locate and then access the WLAN to which the initiating device has connected. This makes it easier for the user of multiple commonly owned devices to access, for example, Internet services when arriving at a WiFi hotspot.

Figure 1:
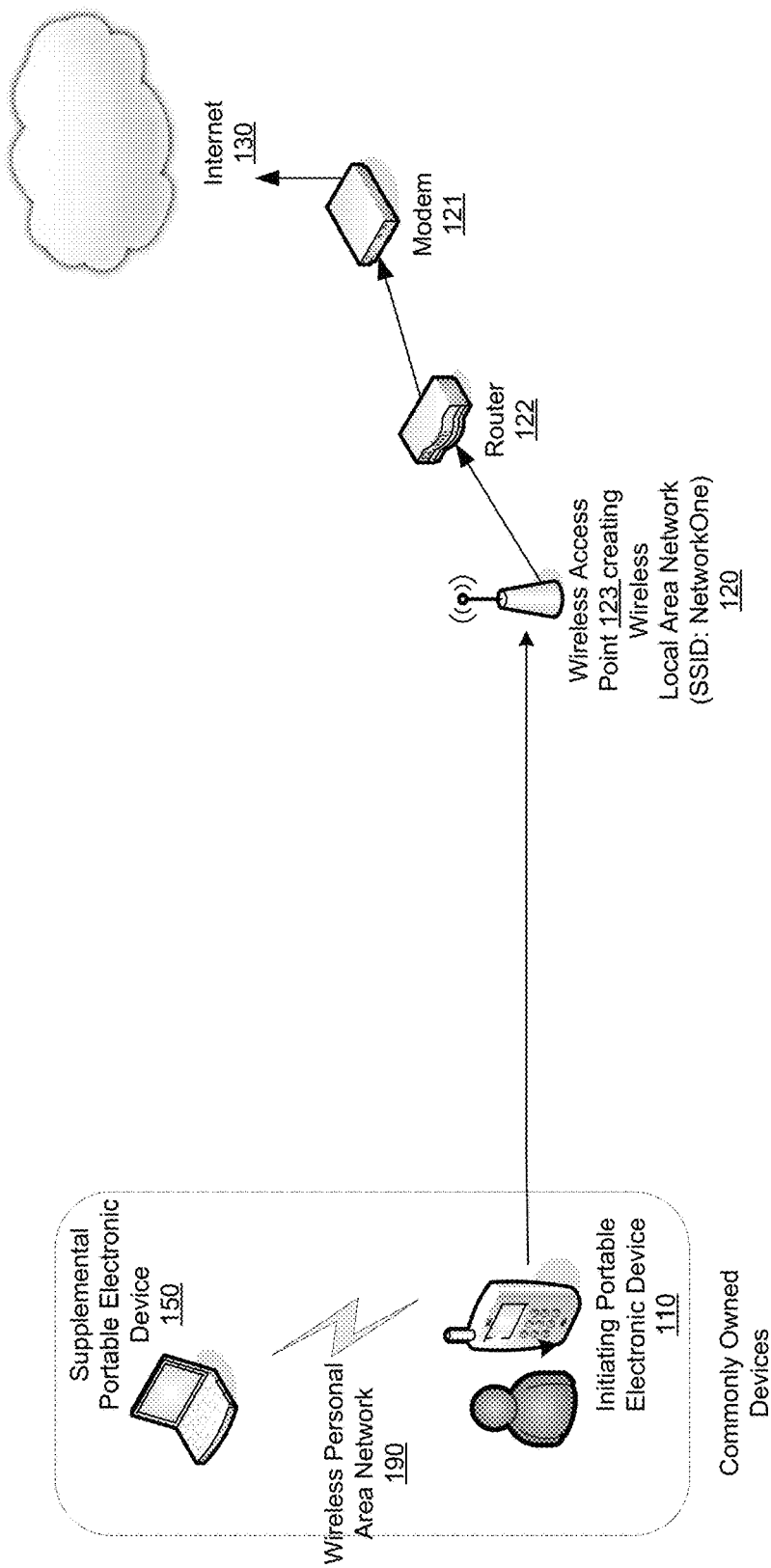
FIG. 1 is a block diagram illustrating wirelessly facilitating network login for commonly owned devices according to one embodiment of the invention.

To begin, FIG. 1 illustrates an example of facilitating a network login through commonly owned devices. This embodiment depicts a user endeavoring to connect commonly owned (also encompassing commonly administered) portable electronic devices 110 and 150 to WLAN 120, where an initiating portable electronic device 110 receives credentials and subsequently transmits those credentials to a supplemental portable electronic device 150 in a message (e.g., message 500 at FIG. 5).

In the embodiment shown at FIG. 1, a modem 121 (e.g., a DSL modem, a cable modem) connects to the Internet 130 to provide access thereto. A router 122 is coupled to the modem 121 to create a local area network allowing devices coupled to router 122 to access the Internet 130. A wireless access point (WAP) 123 is connected to the router 122 to accommodate wireless devices, thus creating wireless local area network (WLAN) 120 (with WLAN service set identifier "NetworkOne"). The modem 121, the router 122 and the WAP 123 do not have to be physically separate and may in fact be housed within the same physical container. As a result of this arrangement of components, the Internet 130 is wirelessly accessible to a device connected to the WLAN 120. Other arrangements of network equipment that allow a device connected to the WLAN 120 to access the Internet 130 are possible, e.g. a broadband connection such as a T1 line modem.

FIG. 1 further shows wireless personal area network (WPAN) 190. WPAN 190 can be any short-range low power consumption wireless network capable of associating (e.g., pairing) initiating device 110 and supplemental device 150 with the capacity to deliver a message (e.g., message 500 at FIG. 5) to supplemental device 150 from initiating device 110. The term "short range" is used here as an approximation, but in most cases will be shorter than the range of a WLAN. Examples of commonly used technologies for WPANs include Bluetooth, infrared data association (IrDA), wireless universal serial bus (wireless USB), and near field communications (NFC).

Figure 5:
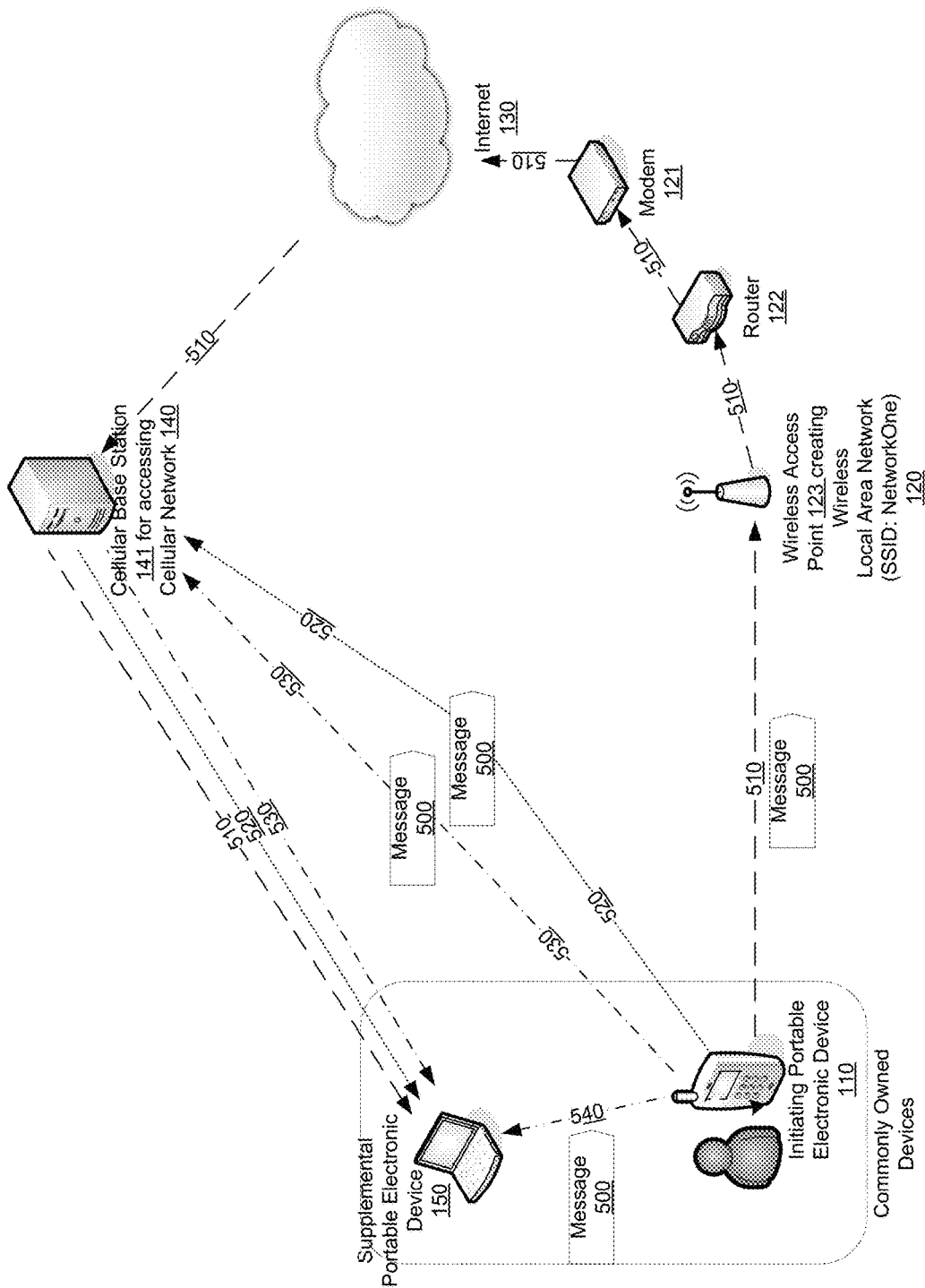
FIG. 5 is block diagram illustrating wirelessly facilitating network login for commonly owned devices through message transmission.

The network (or networks, in some embodiments) utilized to transmit a message from initiating device 110 and the network utilized to receive the message at supplemental device 150 are dependent upon the particular embodiment. Thus, WPAN 190 and the cellular network 140 shown at FIG. 5 are not necessarily present in all embodiments. However, cellular network 140 may still be present even where only WPAN 190 is utilized for message transmission, and vice versa.

Still referring to FIG. 1, an initiating portable electronic initiating device 110 with the capability to connect to a wireless network is shown. As explained in this Specification, initiating portable electronic device 110 facilitates network login to WLAN 120 for commonly owned supplemental device 150. As set forth above, WLAN 120 provides access to Internet 130. Ultimately, both initiating device 110 and supplemental device 150 are able to access Internet 130 through WLAN 120.

In some embodiments where initiating device 110 is a network client, initiating device 110 acts as the initiator in connecting to WLAN 120. Here, WAP 123 acts as a responder to initiating device 110. In embodiments wherein WLAN 120 employs wired equivalent privacy (WEP) security, initiating device 110 may use a shared key included in the credentials (not shown) to connect to WAP 123. In some WEP embodiments, initiating device 110 acts as the initiator by sending an authentication request to the responder WAP 123. WAP 123 responds to the authentication request with a clear text challenge (e.g., an unencrypted random number). In reply, initiating device 110 sends back a new authentication request that includes the clear text challenge encrypted using the shared key. Finally, WAP 123 decrypts the reply from initiating device 110 and responds with a confirmation if the decrypted challenge is authenticated.

In some embodiments, a similar process is repeated by supplemental device 150 in connecting to WLAN 120, once supplemental device 150 has received the credentials from initiating device 110. Similar to initiating device 110, supplemental device 150 is also a network client acting as the initiator in connecting to WLAN 120. Thus, WAP 123 acts as a responder to supplemental device 150. In embodiments wherein WLAN 120 employs wired equivalent privacy (WEP) security, supplemental device 150 may use a shared key included in the credentials (not shown) to connect to WAP 123. In some WEP embodiments, supplemental device 150 acts as the initiator by sending an authentication request to the responder WAP 123. WAP 123 responds to the authentication request with a clear text challenge (e.g., an unencrypted random number). In reply, supplemental device 150 sends back a new authentication request that includes the clear text challenge encrypted using the shared key. Finally, WAP 123 decrypts the reply from supplemental device 150 and responds with a confirmation if the decrypted challenge is authenticated.

In an alternative embodiment, WAP 123 and initiating device 110 can be the same device. In such embodiments, the supplemental device 150 can still access WLAN 120 as described above and herein. However, because the initiating device 110 creates WLAN 120 by acting as WAP 123, initiating device 110 can control the credentials that are transmitted to supplemental device 150. For example, initiating device 110 may transmit credentials that are only valid for a certain duration at WAP 123.

In most embodiments, the shared key or password for WLAN 120 is defined at WAP 123 by a network administrator for WAP 123 (not shown). The network administrator can be the same individual having the commonly owned devices or can be another individual (e.g., the proprietor of a hotel or restaurant offering a WLAN). The network administrator can define a shared key or password for WLAN 120 that is perpetually valid. Alternatively, the network administrator can define a shared key or password that is valid for a temporary period of time. Consequently, initiating device 110 and/or supplemental device 150 will be unable to access WLAN 120 using the temporary shared key or password once the durational validity has expired.

Figure 2:
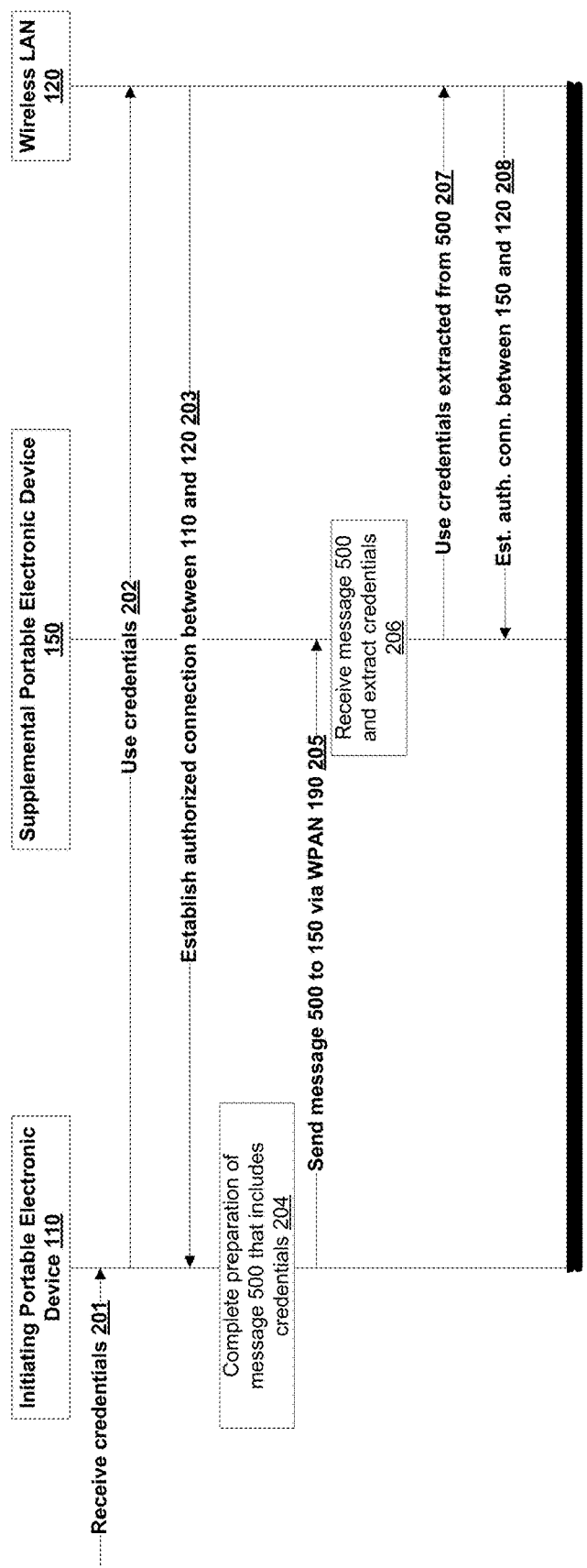
FIG. 2 is a flow diagram illustrating one embodiment of the invention.

Turning to FIG. 2, a process flow of actions or operations for facilitating network login of commonly owned devices is illustrated. At operation 201, initiating portable electronic device 110 receives input to connect to WLAN 120. Generally, the input includes some credentials (e.g., a service set identifier and a shared network key) that allow initiating device 110 to connect to WLAN 120 at wireless access point 123. In one embodiment, this input is received from a user at initiating device 110 (e.g., an owner or administrator of that device manually typing in the SSID and shared key/password). In such an embodiment, initiating device 110 can run a process that presents to the user through a graphical user interface a selectable list of available WLAN networks that have been discovered. In other embodiments, the credentials are not received as user input; for example, the credentials can be received from a universal serial bus (USB) drive. In response to receiving the input that identifies a desired WLAN 120 by its SSID and includes the shared key, initiating device 110 then uses these credentials to connect to the selected WLAN 120 in operation 202.

Still in reference to operation 202 of FIG. 2, initiating device 110 receives a request for a shared network key (also colloquially called a password) to connect to WLAN 120 after initiating device 110 sends a request to connect to WLAN 120 (e.g., as a request transmitted over the air to the WAP 123). At operation 203, initiating device 110 uses the previously inputted network key to connect to WLAN 120 and is thusly connected thereto. In this way, initiating device 110 is able to access Internet 130 through WLAN 120.

Either as part of operation 203 or following operation 203, initiating device 110 may verify that the credentials are valid for accessing WLAN 120 and Internet 130 at any point after receiving the network credentials as input. In one embodiment, where initiating device 110 determines that the network credentials are invalid for accessing WLAN 120 or for accessing Internet 130 through WLAN 120, the initiating device can decline to take further action.

At operation 204 of FIG. 2, initiating device 110 can complete preparation or creation of a message at any point after receiving the network credentials as input. In one embodiment, this message, shown at 500 of FIG. 5, is not prepared or created until after initiating device 110 has verified that the inputted network credentials are valid for connecting to WLAN 120 and/or Internet 130. It is understood that message 500 can be prepared according to a number of different formats, some of which are discussed in this Specification.

The format of message 500 is dictated by the particular method of transmission by initiating device 110. Thus, message 500 is prepared by initiating device 110 according to a format that is interpretable by the commonly owned supplemental device 150. Additionally, message 500 is adapted to be transmitted across a particular wireless network according to the particular embodiment—e.g., where the wireless network is a Bluetooth network, message 500 may be an object according to the Bluetooth generic object exchange profile. The content of message 500 prepared by initiating device 110 includes the values necessary to connect to WLAN 120. These values include at least some of the inputted credentials. Embodiments of message 500 are explored in greater detail later in this Specification.

Following operation 204, message 500 is transmitted to an address of supplemental device 150. An address of supplemental device 150 is any address at which electronic messages addressed to the user or to the user's commonly owned supplemental device 150 can be accessed by supplemental device 150. Illustratively, an address can be a Bluetooth network address of supplemental device 150, an SMS or MMS phone number of supplemental device 150, or an email address of the user accessible by a client at supplemental device 150.

According to the embodiment of FIG. 2, initiating device 110 transmits message 500 to supplemental device 150 across WPAN 190. In an embodiment wherein WPAN 190 is a Bluetooth network, initiating device 110 pairs with supplemental device 150. The pairing partnership can be established at any point prior to transmission of message 500. In one embodiment, initiating device 110 detects supplemental device 150 and identifies it as a pairing partner. The two devices can create a shared link key and respectively store the link key, thus pairing initiating device 110 with supplemental device 150 and effectively creating WPAN 190. Alternatively, supplemental device 150 detects initiating device 110 and identifies initiating device 110 as a pairing partner. In some embodiments, a process running at initiating device 110 recognizes that initiating device 110 has paired with supplemental device 150 and, accordingly, sends the message. This process can recognize that initiating device 110 has paired with supplemental device 150 at any point after receiving the credentials; thus, initiating device 110 does not have to transmit the credentials after receiving them, but can do so at any later time.

In embodiments wherein WPAN 190 is a Bluetooth network, message 500 is transmitted by initiating device 110 across WPAN 190 to a Bluetooth address of supplemental device 150 via Bluetooth protocol according to a specific Bluetooth profile. For example, message 500 can be transmitted as an object using object exchange (e.g., generic object exchange for Bluetooth). In such an embodiment, initiating device 110 detects the Bluetooth address of supplemental device 150 and therefore is able to transmit message 500 to the Bluetooth address of supplemental device 150.

According to an embodiment of the invention shown at operation 205 of FIG. 2, transmission of message 500 can be done automatically. In some embodiments, a process running in the background at initiating device 110 is alerted, or triggered, when initiating device 110 has paired with supplemental device 150. This alert or trigger causes the message to be sent across WPAN 190 to supplemental device 150. In one embodiment, message 500 is sent to a family of devices (not shown) that includes supplemental device 150; for example, the family of devices can include supplemental device 150 and, additionally, a tablet computer performing substantially the same recipient functions as supplemental device 150. The family of devices can be stored in a data structure at initiating device 110. The data structures for storing information such as a family of devices are well known to people of ordinary skill in the art. Accordingly, the process running at initiating device 110 can access the data structure describing the family of devices and send the message to those devices included in the data structure. Alternatively, initiating device 110 presents to the user a list of supplemental portable electronic device addresses to which initiating device 110 can transmit message 500.

Figure 9:
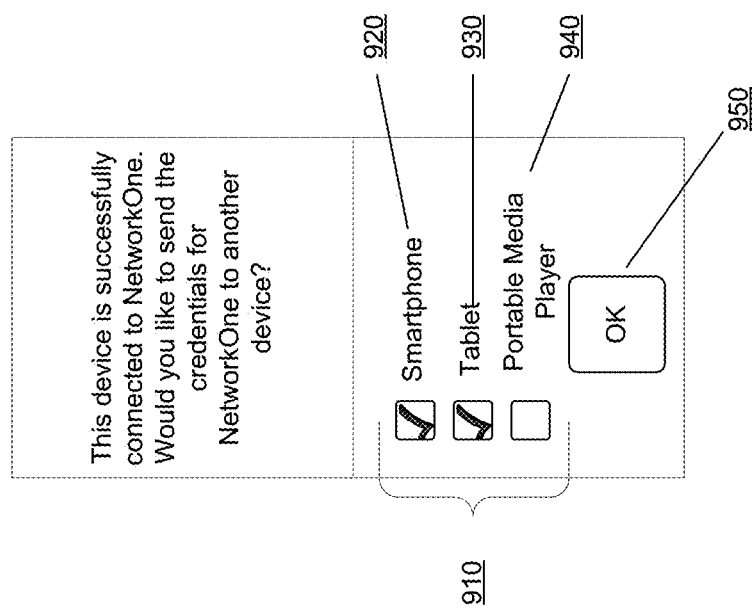
FIG. 9 is a block diagram illustrating a display at the initiating portable electronic device according to one embodiment of the invention.

FIG. 9 illustrates an embodiment of the selection display presented to a user at initiating device 110. In this embodiment, initiating device 110 presents the user with a list of selectable devices 910 that have an associated address to which initiating device 110 can transmit a message. In some embodiments, a family of devices that are commonly owned populates the list 910. This family of devices is stored in a data structure at initiating device 110. In response to receiving a selection from the user, initiating device 110 transmits message 500 to the respective addresses of user-selected devices 920, 930 of list of selectable devices 910.

In the context of FIG. 5, the path of message 500 in the embodiment described at operation 205 of FIG. 2 is illustrated. As described above, the message is prepared at initiating portable electronic device 110 and transmitted by initiating device 110 over WPAN 190 to an address of commonly owned supplemental device 150. Thus according to operation 205 of FIG. 2, message 500 traverses WPAN message path 540 across WPAN 190; message 500 is subsequently received by supplemental device 150 at operation 206.

Referring back to the embodiment of FIG. 2, supplemental device 150 receives message 500 at operation 206. In one embodiment, supplemental device 150 provides a prompt to the user at a user interface of supplemental device 150 to accept message 500. Thus, where the user prefers not to accept message 500 to connect to WLAN 120, supplemental device 150 may receive input in response to the displayed prompt indicating that supplemental device 150 is to reject message 500. Here, supplemental device 150 takes no further action.

In an alternative embodiment of operation 206, supplemental device 150 accepts message 500 and subsequently provides information to the user at a user interface of supplemental device 150 about received message 500. Where the user desires to connect to WLAN 120, supplemental device 150 may provide a prompt at the user interface of supplemental device 150 to the user about whether supplemental device 150 is to use message 500 to connect to WLAN 120.

In some embodiments of operation 206, supplemental device 150 identifies message 500 as one containing values to connect to a WLAN by receiving it at a particular module of supplemental device 150. For example, a process running at supplemental device 150 is adapted to receive and handle the message. This process can be running in the background of supplemental device 150 and can be running perpetually. Alternatively, supplemental device 150 can identify message 500 as one containing values to connect to a WLAN by identifying message 500 as a particular object type. It is understood that other methods of message identification are comprehended by this Specification.

Also at embodiments of operation 206, supplemental device 150 extracts the values, including the credentials originally received as input at initiating device 110, upon receiving message 500 and identifying that message 500 contains values for connecting to a WLAN. Numerous methods of extracting values from a message exist; methods beyond those set forth herein are nonetheless encompassed by this Specification. In an embodiment in which message 500 is received at supplemental device 150 as an object—e.g., over a Bluetooth wireless network—a value can be extracted by calling a public variable containing the value or by calling a method that returns the value. For example, message 500 returns values "NetworkOne" as the SSID and "Password" as the network key or password. Thus, the values necessary to connect to WLAN 120 come to exist at supplemental device 150. The extracted values can be stored in data structures (e.g., string, object, etc.) at supplemental device 150 for fluid access.

At operation 207 of FIG. 2, the extracted values are used by supplemental device 150 to connect to WLAN 120. In one embodiment, an SSID value is extracted from message 500. The SSID is used to locate or verify the WLAN to which supplemental device 150 is to connect. For example, supplemental device 150 sends a request to connect to a WLAN with the SSID "NetworkOne." The WLAN with SSID "NetworkOne"—e.g., WLAN 120—receives the request and returns a request for a network key to supplemental device 150. In response to this request from WLAN 120 at operation 207, supplemental device 150 uses the extracted value for the network key—e.g., "Password". In an alternative embodiment, supplemental device 150 accepts input from a user of a selection of a WLAN (e.g., supplemental device 150 accepts a user selection of an SSID shown at a display of supplemental device 150); supplemental device 150 then uses the network key associated with the user-selected SSID to connect to the WLAN. In some embodiments, a process running in the background at supplemental device 150 is alerted or notified that a message has been received for connecting to a WLAN. Still running in the background, the process automatically selects the appropriate WLAN using the SSID and automatically connects thereto with the network key, thereby seamlessly guiding supplemental device 150 to operation 208 without disrupting any display at supplemental device 150.

Following operation 207, a connection is established at operation 208 between supplemental device 150 and WLAN 120, as well as Internet 130 through WLAN 120. An embodiment of this operation wherein WLAN 120 uses WEP security is described in greater detail above.

FIG. 5 depicts components shown at FIG. 1, but illustrates some alternatives to the preferred embodiment of FIG. 1. For example, FIG. 5 shows cellular base station 141 capable of sending and receiving data from Internet 130. Cellular base station 141 provides cellular network 140 to one or both of initiating device 110 and supplemental device 150. Cellular base station 141 can provide cellular network 140 as a simple mobile telecommunications network with only cellular voice, such as a 2G network. In other embodiments, cellular network 140 can be a mobile telecommunications network with mobile broadband or ultra-broadband functionality for cellular data such as a 3G or 4G network.

Figure 3:
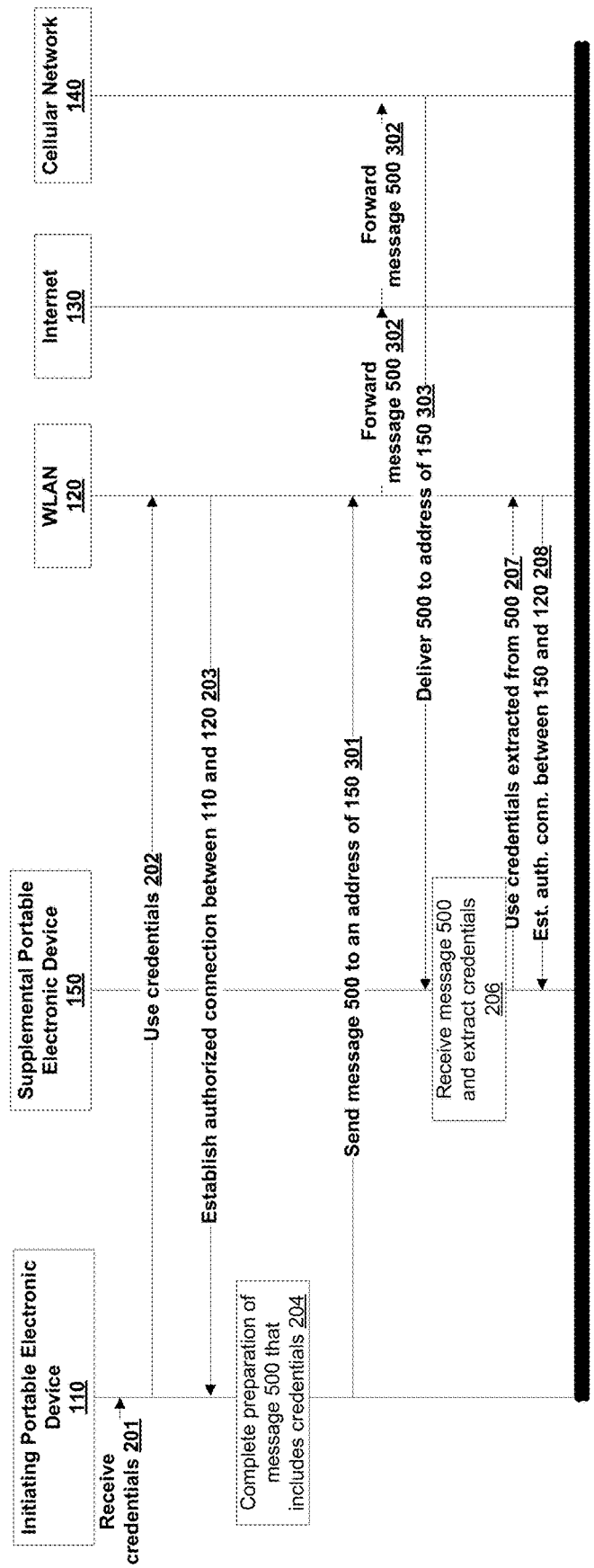
FIG. 3 is a flow diagram illustrating one embodiment of the invention.

An alternative embodiment of the invention is depicted in FIG. 3. In this embodiment, many of the operations of the invention are analogous to those depicted in FIG. 2. However, message 500 with values for connecting to WLAN 120 is not transmitted across WPAN 190. Rather, initiating device 110 transmits message 500 to an address of supplemental device 150 across WLAN 120 and, consequently, across Internet 130.

In the embodiment shown at FIG. 3, operations 201 through 204 are analogous to those operations described with respect to FIG. 2. As mentioned above, the preparation of message 500 by initiating device 110 is dependent upon the particular embodiment. With respect to operation 204 of the embodiment of FIG. 3, message 500 is to be prepared in a format transmissible to WLAN 120, relayed through Internet 130 to cellular network 140 and receivable at supplemental device 150.

In one embodiment of operation 301 of FIG. 3, initiating device 110 transmits message 500 to an electronic mail (email) address of the user of commonly owned portable electronic devices 110 and 150. This email address can be an address of an email account associated with a mail server and accessible by a local mail client (e.g., a Gmail account or iCloud account) at supplemental device 150. In an alternative embodiment, this address can be a short message service (SMS) or multimedia messaging service (MMS) gateway—e.g., 5731235678@txt.att.net or 5731235678@mms.att.net, respectively. It is understood that other possible implementations of message transmission are comprehended by this Specification. For example, message 500 may be transmitted as an instant message to the address of an instant messaging client at supplemental device 150.

At operation 302 of FIG. 3, message 500 is received from initiating device 110 at WAP 123 via WLAN 120. Message 500 then traverses router 122 and modem 121 to Internet 130. Subsequently, message 500 is forwarded through Internet 130 to cellular network 140 for dispatch to an address of supplemental device 150. Here, message 500 may be forwarded from Internet 130 to cellular network 140 through a gateway such as wireless application protocol or other similar Internet gateway.

Following operation 302, cellular network 140 resolves the delivery point for message 500 according to the address provided by initiating device 110 at message 500. Thus, at operation 303 of FIG. 3, message 500 is delivered to the address of supplemental device 150 by cellular network 140.

In the context of FIG. 5, the path of message 500 in the embodiment described at operations 301, 302 and 303 of FIG. 3 is illustrated by message path 510. As described above, the message is prepared at portable electronic initiating device 110 and transmitted by initiating device 110 to an address of commonly owned supplemental device 150. Message 500 is first received into WLAN 120 at WAP 123. Message 500 then passes through router 122 and modem 121 to Internet 130. According to the address of message 500, Internet 500 forwards message 500 to cellular network 140. In turn, cellular network 140 resolves the address point at which to deliver message 500 and relays the message to this address.

Where supplemental device 150 receives message 500 at operation 206 of FIG. 3, operation 206 is substantially analogous to operation 206 described with respect to FIG. 2. However, particular embodiments of the extracting the credentials at supplemental device 150 may depart from those described with respect to the embodiment of FIG. 2. Varying embodiments notwithstanding, operation 206 shows that the values necessary to connect to WLAN 120 are received at supplemental device 150 through extraction of the credentials from message 500.

According to one embodiment of the invention shown at FIG. 3, message 500 is received as an email message at an email client of supplemental device 150. Either the email client or another program (e.g., a messaging module to process incoming messages or a process, such as a background process) operating at supplemental device 150 can be adapted to recognize that an incoming email message contains values for connecting to WLAN 120. For example, the email message can have a specific subject header field or another x-header field indicating that the email message contains values for connecting to WLAN 120. Alternatively, the email client or other program can scan the body of the email message (e.g., by parsing the text) for specific content or tags (e.g., XML tags) indicating that the email message contains values for connecting to WLAN 120.

In the embodiment of FIG. 3 in which message 500 is received as an SMS message at supplemental device 150, an SMS client or other program (e.g., an application within a messaging module to process incoming messages or a process, such as a process running in the background) scans the body of message 500 to determine if it contains values for connecting to WLAN 120. Preferably, message 500 has specific content or tags—e.g., extensible markup language (XML) tags—indicating that the message contains values for connecting to WLAN 120.

An embodiment according to FIG. 3 in which message 500 is an MMS message is similar to the embodiment in which message 500 is an SMS message—that is, an MMS client or other program (e.g., an application within a messaging module to process incoming messages or other process running in the background) scans the body of message 500 to determine if it contains values for connecting to WLAN 120. In one embodiment, message 500 has specific content or tags (e.g., XML tags) indicating that the message contains values for connecting to WLAN 120. However, because an MMS message can include a subject field, this embodiment also comprehends an MMS client or other program that identifies a message containing values to connect to WLAN 120 by the value of subject of the message.

Operations 207 and 208 of FIG. 3 are analogous to those operations described above with respect to FIG. 2. Thus, the extracted values are used by supplemental device 150 to connect to WLAN 120. In one embodiment, an SSID value is extracted from message 500. The SSID is used to locate or verify the WLAN to which supplemental device 150 is to connect. For example, supplemental device 150 sends a request to connect to a WLAN with the SSID "NetworkOne." The WLAN with SSID "NetworkOne"—e.g., WLAN 120—receives the request and returns a request for a network key to supplemental device 150. In response to this request from WLAN 120 at operation 207, supplemental device 150 uses the extracted value for the network key—e.g., "Password." Accordingly, a connection is established at operation 208 between supplemental device 150 and WLAN 120, as well as Internet 130 through WLAN 120. An embodiment of this operation wherein WLAN 120 uses WEP security is described in greater detail above.

Figure 4:
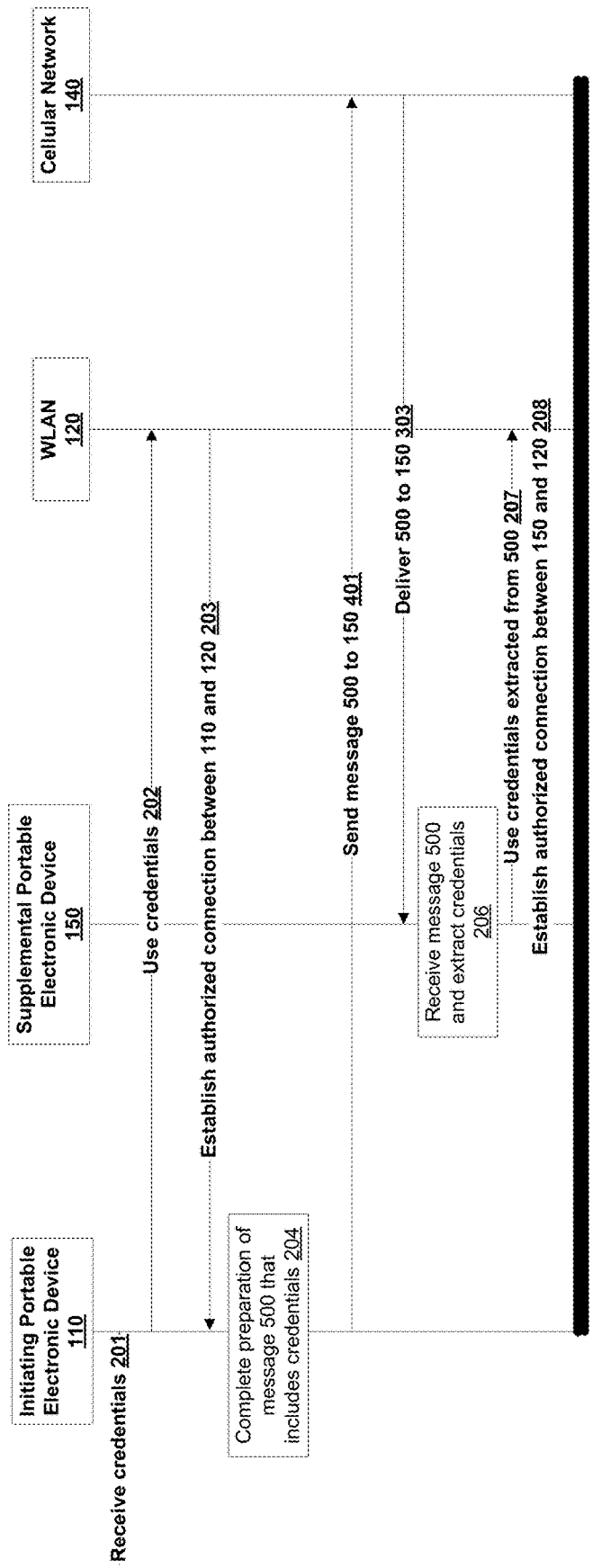
FIG. 4 is a flow diagram illustrating one embodiment of the invention.

A third embodiment of the invention is depicted in FIG. 4. In this embodiment, many of the operations of the invention are analogous to those depicted in FIGS. 2 and 3. However, message 500 with values for connecting to WLAN 120 is transmitted by initiating device 110 to an address of supplemental device 150 across cellular network 140.

In the embodiment shown at FIG. 4, operations 201 through 204 are analogous to those operations described with respect to FIG. 2. As mentioned above, the preparation of message 500 by initiating device 110 is dependent upon the particular embodiment. With respect to operation 204 of the embodiment of FIG. 4, message 500 is to be prepared in a format transmissible across cellular network 140 and receivable at supplemental device 150.

In one embodiment of operation 401 of FIG. 4, initiating device 110 transmits message 500 to an SMS address of supplemental device 150 across cellular network 140. In this embodiment, cellular network 140 is a cellular voice network. In the context of FIG. 5, the path of message 500 in the embodiment described at operations 401 and 303 of FIG. 4 is illustrated along cellular voice network 520. As described above, the message is prepared at initiating portable electronic device 110 and transmitted by initiating device 110 to an address of commonly owned supplemental device 150. Message 500 is transmitted across cellular voice network 520 into cellular network 140 at cellular base station 141. Cellular network 140 resolves the address point at which to deliver message 500 and relays the message to this address along cellular voice network 520. Thus, at operation 303 of FIG. 4, message 500 is delivered to the address of supplemental device 150 by cellular network 140.

In an alternative embodiment of FIG. 4, this address can be an MMS address of supplemental device 150. In this embodiment, cellular network 140 is a cellular data network. In the context of FIG. 5, the path of message 500 in the embodiment described at operations 401 and 303 of FIG. 4 is illustrated along cellular data network 530. As described above, the message is prepared at initiating portable electronic device 110 and transmitted by initiating device 110 to an address of commonly owned supplemental device 150. Message 500 is transmitted across cellular data network 530 to cellular base station 141. Cellular network 140 resolves the address point at which to deliver message 500 and relays the message to this address along cellular data network 530. Thus, at operation 303 of FIG. 4, message 500 is delivered to the address of supplemental device 150 by cellular network 140.

In another embodiment of FIG. 4 wherein message 500 is transmitted across a cellular data network (e.g., 530 of FIG. 5), the address of message 500 specified by initiating device 110 can be an instant messaging address of supplemental device 150. It is understood that other possible implementations of message transmission are comprehended by this Specification. In all embodiments of operation 303 in FIG. 4, cellular network 140 resolves the delivery point for message 500 according to the address provided by initiating device 110 and delivers message 500 thereto.

Where supplemental device 150 receives message 500 at operation 206 of FIG. 4, operation 206 is substantially analogous to operation 206 described with respect to FIG. 2 and FIG. 3. However, particular embodiments of extracting the credentials at supplemental device 150 may depart from those described with respect to the embodiments of FIG. 2 and FIG. 3. Varying embodiments notwithstanding, operation 206 shows that the values necessary to connect to WLAN 120 are received at supplemental device 150 through extraction of the credentials from message 500.

In the embodiment of FIG. 4 in which message 500 is received as an SMS message at supplemental device 150, an SMS client or other program (e.g., an application within a messaging module to process incoming messages, or a process such as a background process) scans the body of message 500 to determine that it contains values for connecting to WLAN 120. Preferably, message 500 has specific content or tags (e.g., XML tags) indicating that the email message contains values for connecting to WLAN 120.

An embodiment according to FIG. 4 in which message 500 is an MMS message is similar to the embodiment in which message 500 is an SMS message—that is, an MMS client or other program (e.g., an application within a messaging module to process incoming messages or a process such as a background process) scans the body of message 500 to determine if it contains values for connecting to WLAN 120. In one embodiment, message 500 has specific content or tags (e.g., XML tags) indicating that the email message contains values for connecting to WLAN 120. However, because an MMS message can include a subject field, this embodiment also comprehends an MMS client or other program that identifies a message containing values to connect to WLAN 120 by the value of subject of the message.

Operations 207 and 208 of FIG. 4 are analogous to those operations described above with respect to FIG. 2. Thus, the extracted values are used by supplemental device 150 to connect to WLAN 120. In one embodiment, an SSID value is extracted from message 500. The SSID is used to locate or verify the WLAN to which supplemental device 150 is to connect. For example, supplemental device 150 sends a request to connect to a WLAN with the SSID "NetworkOne." The WLAN with SSID "NetworkOne"—e.g., WLAN 120—receives the request and returns a request for a network key to supplemental device 150. In response to this request from WLAN 120 at operation 207, supplemental device 150 uses the extracted value for the network key—e.g., "Password." Accordingly, a connection is established at operation 208 between supplemental device 150 and WLAN 120, as well as Internet 130 through WLAN 120. An embodiment of this operation wherein WLAN 120 uses WEP security is described in greater detail above.

In one embodiment, the operations described at FIGS. 2 through 4 have the robustness to handle dynamic changes to certain parameters of WLAN 120 after devices 110 and 150 are connected thereto. For example, consider a scenario in which a user changes the display name or SSID of WLAN 120 while both initiating device 110 and supplemental device 150 are connected thereto. In this situation, initiating device 110 can be transferred to the new network (e.g., automatically, through user input, etc.). For example, in one embodiment a process at initiating device 110 is configured to detect a change to the display name or SSID of WLAN 120 and update a data structure at initiating device 110 containing the display name or SSID of the WLAN to which initiating device 110 is currently connected. Alternatively, initiating device 110 can accept user input to connect to the WLAN having the changed display name or SSID. Thereafter, initiating device 110 can create a new message 500 indicating that the SSID of WLAN 120 is updated (e.g., by providing an updated display name or SSID in the message) and the supplemental device 150 is to connect to WLAN 120 using the updated SSID. Analogous techniques apply so that other dynamic changes to WLAN 120 propagate to supplemental device 150; for example, changes to the password of WLAN 120. Accordingly, both initiating device 110 and supplemental device 150 remain robustly connected to WLAN 120.

Message

Figure 6:
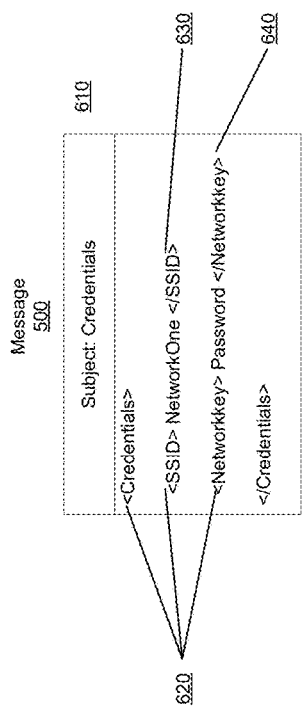
FIG. 6a is a block diagram of an example message data structure according to one embodiment of the invention.
FIG. 6b is a block diagram of an example message according to another embodiment of the invention.

FIGS. 6a and 6b exemplify simple embodiments of the message to be transmitted from an initiating device to a supplemental portable electronic device wherein the message contains values to connect to a WLAN. The embodiments shown at FIGS. 6a and 6b can be the messages transmitted as message 500 in the embodiment at FIG. 2 and message 500 in the embodiment at FIGS. 3 and 4, respectively. It is understood that these two embodiments are illustrative and should not be regarded as limiting. The message can have additional value fields, alternative formatting, or any number of different configurations while still maintaining the spirit of the invention.

Beginning first with the embodiment of FIG. 6a, message 500 includes the SSID 620 of WLAN 120 and network key 630 to access WLAN 120. In other embodiments, additional values can be included in the message. In one embodiment, additional values are received as input from a user. Furthermore, additional values can be parameters detected by initiating device 110 that may be necessary to access WLAN 120 and Internet 130. Examples of other values include security type (e.g., wired equivalent privacy) and proxy server information (e.g., port or server).

The format of the message varies according to the embodiment of the invention. In the embodiment of FIGS. 3 and 4, the message 500 must be of a format suitable to be received by supplemental device 150 via cellular network 140.

In an embodiment shown in FIG. 3, message 500 is prepared by initiating device 110 as an electronic mail (email) message. In this embodiment, the content (i.e., values to access WLAN 120) of message 500 can be formatted for compatibility with an application program interface on the supplemental device 150. For example, the body of message 500 can be composed as in a markup language, such as XML. In such a case, the values can be clearly delineated and easily interpretable by the supplemental device 150. The body of message 500 can be especially brief to promote speed and simplicity in the transmission and reception of the message 500. A simple XML embodiment is depicted at FIG. 6*a*. Here, markup tags 620 act to clearly delineate SSID value 630 and network key value 640.

In an alternative embodiment, the values (e.g., credentials) within message 500 are separated by delimiters. For example, the value of the SSID and the value of the network key or password are separated by a semicolon in body of the message: NetworkOne;Password1. It is understood that other delimiters (e.g., comma, forward slash, etc.) are encompassed by this Specification.

As explained above, supplemental device 150 of FIGS. 3 and 4 is adapted to receive message 500 and extract values 630, 640 therefrom. According to an embodiment of the message shown at FIG. 6*a*, supplemental portable electronic device 150 receives message 500 as an email message or MMS message and identifies it as a message having values to connect to a WLAN by evaluating Subject 610. Where message 500 is an email message, Subject 610 can be the subject header field or another x-header field of the email message. Upon determining that message 500 contains values for connecting to a WLAN, supplemental device 150 can extract values 630, 640 from message 500. In an embodiment according to FIG. 6*a*, values 630, 640 can be extracted through an XML unmarshaller. Alternatively, the values can be extracted through simply parsing message 500.

In embodiments of FIG. 4 wherein message 500 is an SMS message, Subject 610 is absent from message 500. Thus, supplemental device 150 can identify message 500 as one having values to connect to a WLAN by evaluating markup tags 620. For example, message 500 can contain additional markup tags, such as <Credentials> . . . </Credentials>, to indicate message 500 contains values for connecting to a WLAN.

Turning to the embodiment shown at FIG. 6*b*, message 500 is illustrated as an object adapted to be exchanged via a WPAN. In accordance with an embodiment of FIG. 2, message 500 can be an object that is transmitted from initiating device 110 to supplemental device 150 according to the generic object exchange profile of Bluetooth. It is understood that other Bluetooth profiles are encompassed by this Specification.

According to an embodiment of FIG. 6*b*, message 500 includes the variables SSID 650 of WLAN 120 and network key 660 to access WLAN 120. In other embodiments, additional values can be included in the message. In one embodiment, these additional values are received at supplemental device 150 as input from a user. In another embodiment, additional values can be parameters detected by the initiating device 110 that may be necessary to access WLAN 120 and Internet 130. Examples of other values include security type (e.g., wired equivalent privacy) and proxy server information (e.g., port or server).

The format of the message varies according to the embodiment of the invention. In the embodiment of FIG. 2, message 500 must be of a format suitable for transmission by the initiating device 110 across WPAN 190 and suitable to be received by supplemental device 150 via WPAN 190.

In an embodiment shown in FIG. 2, message 500 is prepared by initiating device 110 as an object. In this embodiment, the object can be formatted for compatibility with an application program interface on supplemental device 150. For example, the object can have variables 650, 660 that are publically accessible, such as by calling Message.SSID or Message.NetworkKey, respectively. Alternatively, the object can have publically accessible methods that return the values 650, 660—shown at FIG. 6*b* as Message.Get_SSID( ) 670 and Message.Get_NetworkKey( ) 680, respectively. It is understood that this embodiment is illustrative; other techniques for extracting values from a message transmitted over a WPAN are comprehended by this Specification.

As explained above, supplemental device 150 is adapted to receive message 500 and extract values 650, 660 therefrom. According to an embodiment of the message shown at FIG. 6*b*, supplemental device 150 receives message 500 as an object. Supplemental device 150 is adapted to recognize message 500 contains values for connecting to a WLAN by, for example, recognizing that message 500 is of a particular object type or by receiving message 500 at a particular module (e.g., a messaging module to process an incoming message of supplemental device 150, or a process running at supplemental device 150 such as a background process).

In an alternative embodiment, connecting to WLAN 120 is predicated upon first accessing a WLAN connection page at a local browser. The WLAN connection page may be, for example, a website configured to accept payment prior to connecting a device to WLAN 120. In such a scenario, each device may only be able to access WLAN 120 through the WLAN connection page. Therefore, initiating device 110 may include in message 500 the uniform resource locator (URL) of the WLAN connection page. Accordingly, supplemental device 150 may extract the URL of the WLAN connection page from the received message 500, and then access the URL whereupon the user is then guided through a payment process before authorizing the supplemental device 150 to access the WLAN 120.

Initiating Device

Figure 7:
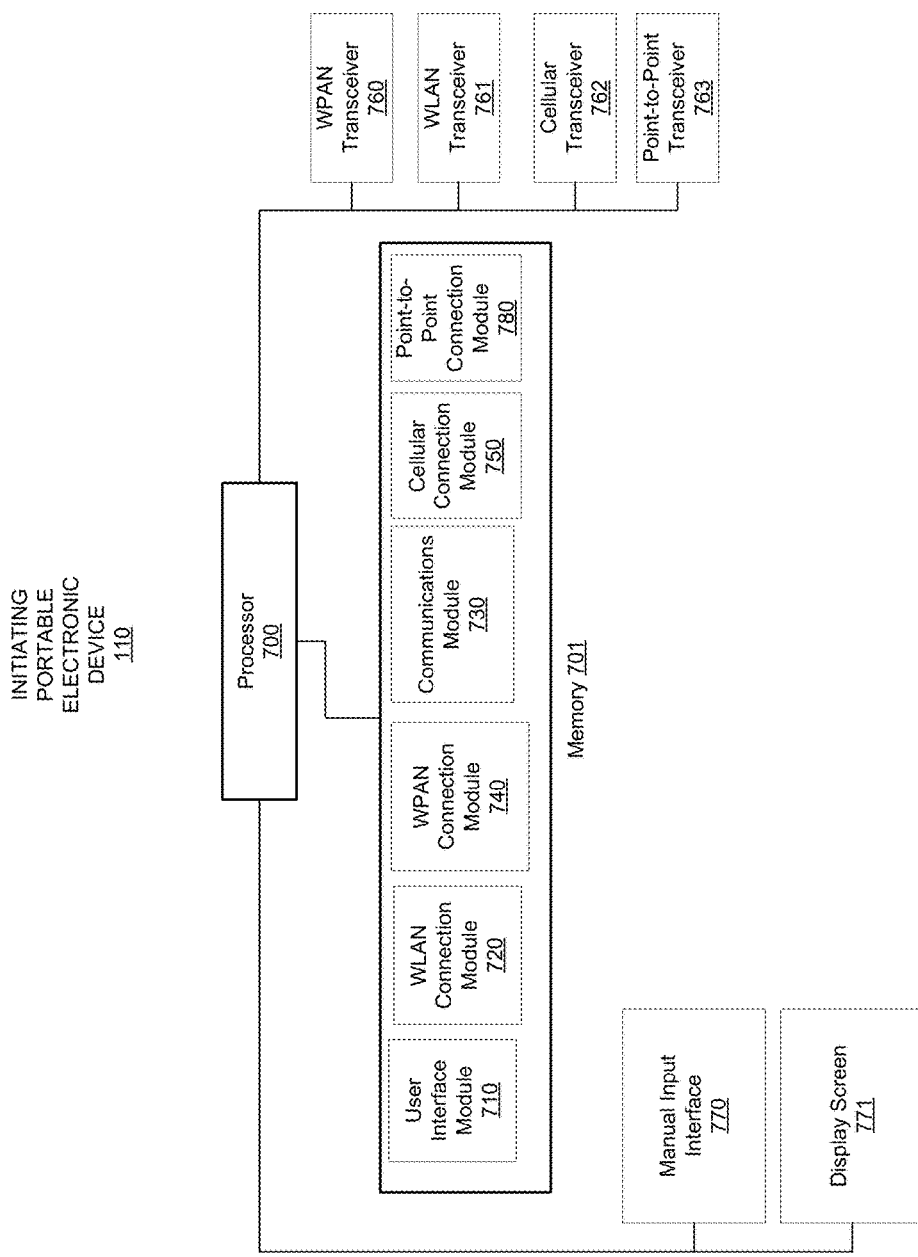
FIG. 7 is a functional block diagram of an initiating portable electronic device to facilitate network login for a supplemental portable electronic device according to one embodiment of the invention.

FIG. 7 is a block diagram of an initiating device in accordance with an embodiment of the invention. This block diagram illustrates an embodiment of initiating device 110 of FIG. 1. Initiating device 100 can include processor 700 and associated memory 701. The modules 710-750 and 780 for realizing the functionality of initiating device 110 may be stored at memory 701 and accessed through processor 700. It should be noted that not all modules 810-880 and transceivers 860-863 are necessarily present in every embodiment—for example, the memory 701 of initiating device 110 can include WPAN connection module 740 even where the message is transmitted through WLAN connection module 720. Initiating device 110 may be a personal computer, such as a laptop, tablet, or handheld computer. Alternatively, the initiating device may be embodied in another portable electronic device having the functionality of a cellular phone handset, a personal digital assistant (PDA), a digital multimedia player, or a multi-function consumer electronic device combining some or all of the foregoing functions.

Memory 701 of initiating device 110 has a user interface module 710 that displays a graphical user interface (GUI) to allow a user of initiating device 110 to interact with various modules located at memory 701 of initiating device 110. The GUI displays icons or graphical images that represent application programs, files, and their associated commands at display screen 771 of initiating device 110. These may include windows, fields, dialog boxes, input boxes, menus, buttons, cursors, scrollbars, etc. During operation, the user can select and activate various graphical images to initiate functions associated therewith. Initiating device 110 accepts input from the user to user interface module 710 through manual input interface 770. Manual input interface 770 may be a physical keyboard, a mouse, or other dedicated input device; however, manual input interface 770 may be a touch sensitive input device and can even be located at display screen 771.

In one embodiment, user interface module 710 presents to the user at display screen 771 a selection menu of WLAN networks that are within range of initiating device 110. Initiating device 110 receives from the user through manual input interface 770 a selection of a particular WLAN. Alternatively, user interface module 710 can present to the user an input box so initiating device 110 can receive a specific SSID as user input (e.g., in the case of a WLAN that does not broadcast its SSID). In the embodiment depicted at FIG. 1, initiating device 110 receives a selection of WLAN having SSID "NetworkOne."

According to the embodiment of initiating device 110 at FIG. 7, WLAN connection module 720 receives from WLAN transceiver 761 a clear text challenge originating from WAP 123. WLAN connection module 720 encrypts the clear text challenge using a network key and responds via WLAN transceiver 761 with a request that includes the encrypted clear text challenge. Accordingly, the network key should be resolved for WAP 123 prior to initiating device 110 receiving the clear text challenge from WAP 123. In one embodiment, initiating device 110 presents at display screen 771 an input box for the network key to a user through user interface module 710. Accordingly, initiating device 110 receives from the user into the input box at display screen 771 and into user interface module 710 a network key value for WAP 123. WLAN connection module 720 is then able to encrypt the clear text challenge received from WAP 123 using the user-inputted network key. In one embodiment, WLAN connection module 720 then verifies that initiating device 110 is connected to WLAN 120 through WAP 123 and can connect to Internet 130 through WLAN 120.

Still referring to the embodiment of FIG. 7, at any point after receiving the SSID selection and network key at user interface module 710, communications module 730 can complete creation or preparation of a message containing the SSID selection and network key received as user input. The embodiment of the message is dependent upon the particular method of transmission to be used by initiating device 110. In some embodiments, user interface module 710 can provide a prompt at display screen 771 to the user requesting confirmation that the message is to be prepared and/or sent. An embodiment of such a prompt is provided at FIG. 9 and described above.

Following message preparation by communications module 730 according to the embodiment of FIG. 2, the message is transmitted by initiating device 110 through WPAN connection module 740 using WPAN transceiver 760. In one embodiment, WPAN connection module 740 is a Bluetooth module and WPAN transceiver 760 is a Bluetooth transceiver. In this embodiment, WPAN connection module 740 detects the presence of a pairing partner (e.g., supplemental device 150) and correspondingly pairs with the pairing partner; this function is executed prior to transmission of the message.

In one embodiment, WPAN connection module 740 verifies that the pairing partner (e.g., supplemental device 150) is adapted to accept message 500. This verification can be performed by transmitting a request using WPAN transceiver 760 to the pairing partner and receiving a response to the request or, alternatively, by receiving a response from the pairing partner without a request from initiating device 110. In such embodiments, initiating device 110 first pairs with the pairing partner and then performs message capability verification prior to transmitting message 500.

Following message preparation by communications module 730 according to the embodiment of FIG. 3, the message is transmitted by initiating device 110 through WLAN connection module 720 using WLAN transceiver 761 to WLAN 120 and then to Internet 130 for receipt at supplemental device 150. Various message formats according to this embodiment are described above.

Following message preparation by communications module 730 according to the embodiment of FIG. 4, the message is transmitted by initiating device 110 through cellular connection module 750 using cellular transceiver 762 to cellular network 140 for delivery to supplemental device 150. Various message formats according to this embodiment are described above.

According to another embodiment of the invention, the message is transmitted by point-to-point module 780 using point-to-point transceiver 763. Point-to-point transceiver 763 can transmit message over the air across a point-to-point network using near field communication.

Supplemental Device

Figure 8:
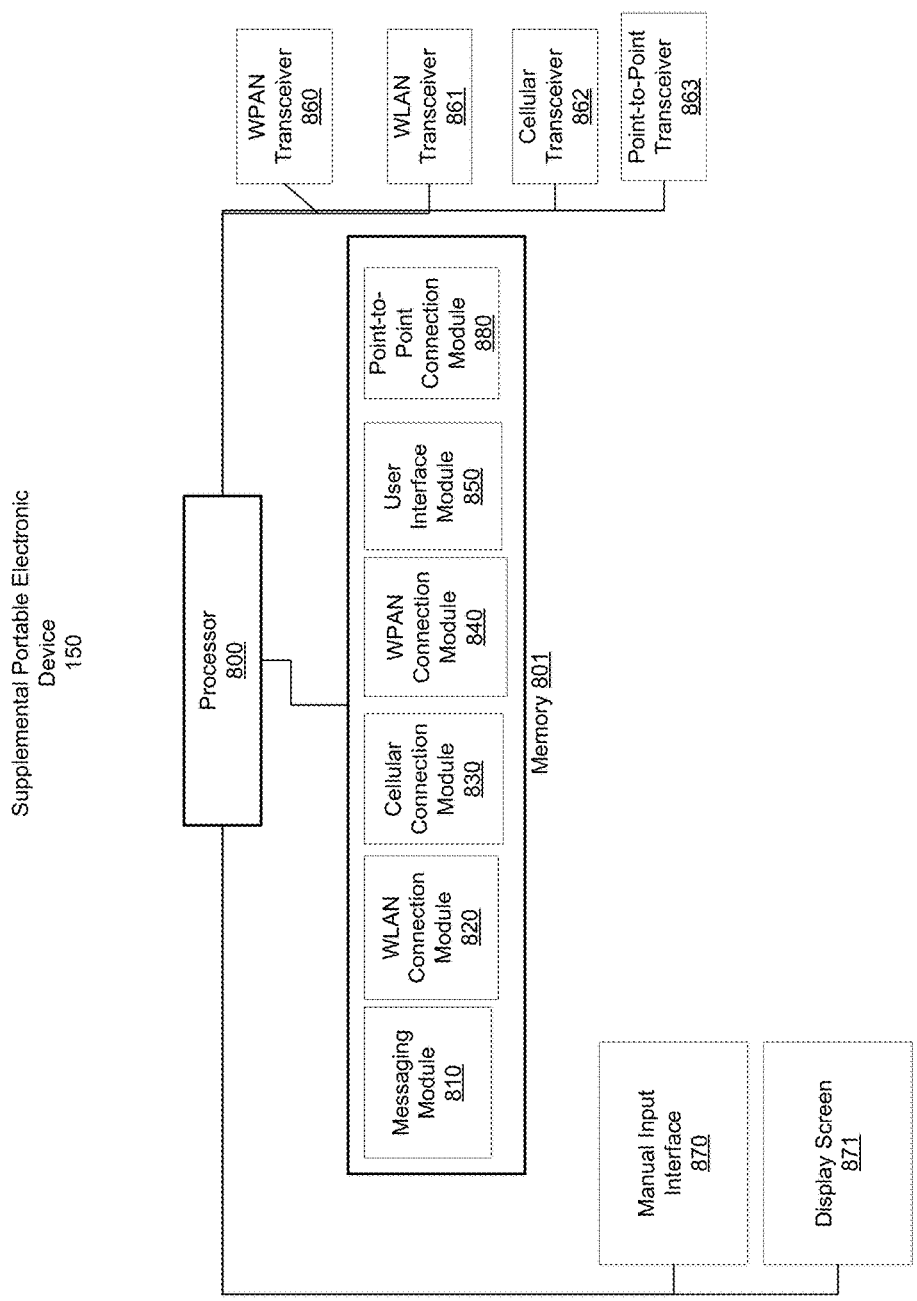
FIG. 8 is a functional block diagram of a supplemental portable electronic device to receive network login facilitation from an initiating portable electronic device according to one embodiment of the invention.

FIG. 8 is a block diagram of a supplemental portable electronic device in accordance with an embodiment of the invention. This block diagrams illustrates an embodiment of supplemental device 150 of FIG. 1. Initiating device 100 can include processor 800 and associated memory 801. The modules 810-850 and 880 for realizing the functionality of supplemental device 150 may be stored at memory 801 and accessed through processor 800. It should be noted that not all modules 810-880 and transceivers 860-863 are necessarily present in every embodiment—for example, supplemental device 150 can include WPAN connection module 840 and associated WPAN transceiver 860 even where the message is received at cellular connection module 830 through cellular transceiver 862. Supplemental device 150 may be a cellular phone handset, a personal digital assistant (PDA), a digital multimedia player, or a multi-function consumer electronic device combining some or all of the foregoing functions. Alternatively, the supplemental portable electronic device may be embodied in another electronic device having the functionality of a personal computer, such as a laptop, tablet, or handheld computer.

Supplemental device 150 has a user interface module 850 that displays a graphical user interface (GUI) at display screen 871 to allow a user of supplemental device 150 to interact with various modules located at supplemental device 150. The GUI displays icons or graphical images that represent application programs, files, and their associated commands at supplemental device 150. These may include windows, fields, dialog boxes, input boxes, menus, buttons, cursors, scrollbars, etc. During operation, the user can select and activate various graphical images to initiate functions associated therewith. Supplemental device 150 accepts input from the user to user interface module 850 through manual input interface 870. Manual input interface 870 may be a physical keyboard, a mouse, or other dedicated input device; however, manual input interface 870 may be a touch sensitive input device and can even be located at display screen 871.

According to one embodiment of supplemental device 150 shown at FIG. 8, supplemental device 150 has WPAN connection module 840. WPAN connection module 840 is adapted to process message 500 transmitted across WPAN 190 and received at WPAN transceiver 860. In an embodiment, WPAN connection module 840 is a Bluetooth module and, associated WPAN transceiver 860 is a Bluetooth transceiver. This Bluetooth module can be implemented according to any different Bluetooth profile. In one embodiment in which message 500 is an object, WPAN connection module 840 has a generic object exchange profile according to Bluetooth protocol. It is understood that message 500 can be received at supplemental device 150 through either a push or pull request. Upon receiving message 500 at WPAN connection module 840, message 500 is processed (e.g., values are extracted) at messaging module 810.

According to an embodiment of supplemental device 150 shown at FIG. 8, supplemental device 150 has cellular connection module 830 and associated cellular transceiver 862. Cellular connection module 830 is adapted to receive message 500 through cellular transceiver 862 transmitted across cellular network 140. Cellular transceiver 862 may be adapted to receive messages across both a cellular voice network and a cellular data network. Correspondingly, cellular connection module 830 can be adapted to receive message from both a cellular voice network and a cellular data network. In one embodiment, message 500 is received as an email message at cellular connection module 830. Alternatively, message 500 can be received as an SMS or MMS message at cellular connection module 830. Upon receiving message 500 at cellular connection module 830, message 500 is processed (e.g., values are extracted) at messaging module 810.

According to one embodiment of the invention, user interface module 850 provides a prompt to the user at display screen 871 of supplemental device 150 confirming that supplemental portable electronic device 150 is to accept message 500. In another embodiment, user interface module 850 provides a prompt to the user at display screen 871 of supplemental device 150 confirming that supplemental portable electronic device is to connect to WLAN 120 using values extracted from message 500.

In embodiments of supplemental device 150 according to FIGS. 2 through 4, messaging module 810 is adapted to extract the values from respective message 500. Illustrative embodiments of value extraction from the message are described in greater detail above. Example values include an SSID of a WLAN and a network key to access the WLAN. In one embodiment, messaging module 810 stores the extracted values in data structures at supplemental device 150. According to such an embodiment, the stored values for accessing WLAN 120 are available to other modules (e.g., WLAN connection module 820).

Still referring to embodiments of the supplemental portable electronic device according to FIGS. 2 through 4, WLAN connection module 820 is adapted to leverage the values made available by messaging module 810 to access WLAN 120.

In one embodiment, WLAN connection module 820 locates or detects WLAN 120 through an SSID value extracted from respective message 500 by messaging module 810. In response to locating WLAN 120 by WLAN connection module 820 using the SSID value, WLAN connection module 820 sends a request using WLAN transceiver 861 to connect to WLAN 120. In embodiments wherein WLAN 120 is a secure WLAN, WLAN connection module 820 can receive a clear text challenge from WAP 123 through WLAN transceiver 861 before gaining access to WLAN 120. In response, WLAN connection module 820 transmits an authentication request using WLAN transceiver 861 that includes the clear text challenge encrypting using the network key extracted from message 500 by messaging module 810. Thus, supplemental device 150 gains access to WAP 123, to WLAN 120, and to Internet 130.

According to another embodiment of the invention, the message is received by point-to-point module 880 using point-to-point transceiver 863. Point-to-point transceiver 863 can receive the message over the air across a point-to-point network using near field communication.

Other Embodiments

In some embodiments, the credentials can be sent from supplemental device 150 to additional devices (not shown) that function in the same capacity as supplemental device 150 (e.g., receiving the message and using the message to access a wireless network). In such embodiments, a single device operates as both supplemental device 150 and initiating device 110. For example, consider a user with three devices she would like to connect to a WLAN: a laptop, a tablet computer, and a smart phone. Initially, the laptop receives the credentials as user input and uses the credentials to access a WLAN; here, the laptop is the initiating device 110. Thereafter, the laptop forwards the credentials to a tablet computer; here, the tablet computer is the supplemental device 150. If this user subsequently desires to send the credentials to her smart phone, the credentials can be forwarded from the tablet computer to the smart phone (instead of from the laptop). In this subsequent circumstance, the tablet computer, having received the credentials as input from the laptop, acts as an initiating device 110 and forwards the credentials to the smart phone, the smart phone then receiving the credentials as a supplemental device 150. Variations on this embodiment are comprehended by this Specification; for example, a prompt can be presented to the user at a display of a device that is acting first as a supplemental device and then as an initiating device, requesting the user to confirm that the device should forward the credentials to another device.

Figure 10B:
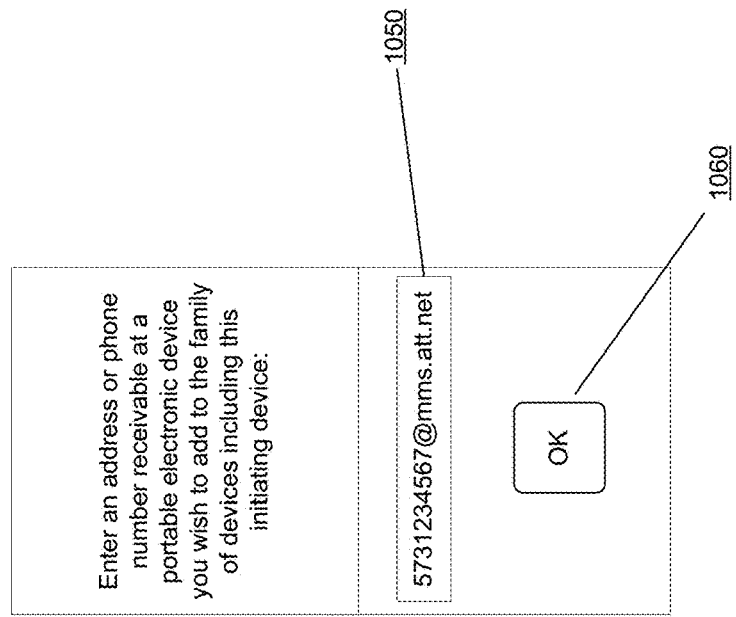
FIG. 10b is a block diagram illustrating a display at the initiating portable electronic device according to one embodiment of the invention.
Figure 10A:
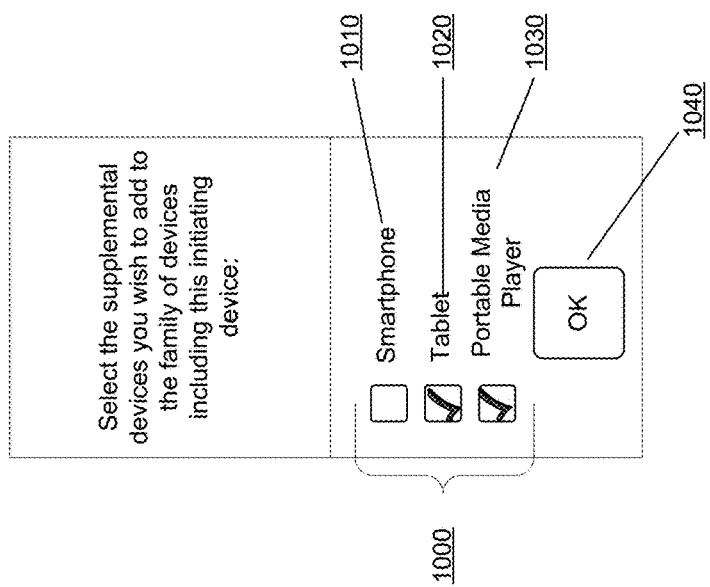
FIG. 10a is a block diagram illustrating a display at the initiating portable electronic device according to one embodiment of the invention.

In the embodiments described above, it is assumed that there is an association between initiating device 110 and one or more supplemental devices, thereby creating a family of commonly owned devices. This family of commonly owned devices can be identified as such, in a data structure that is stored in the initiating device 110. The data structure can then be accessed by one or more processes running in the initiating device 110, such as a process to transmit a message containing the credentials. The association can be defined by the user. In the embodiment shown at FIG. 10a, initiating device 110 presents to the user (on its display) a list of selectable devices 1000 including identifiers 1010, 1020, 1030. The user is able to select and confirm (via an OK button 1040) one or more devices which are in the commonly owned family of devices and to which the initiating device 110 can transmit the message (e.g., message 500 shown at FIG. 5). In the example shown at FIG. 10a, the user has selected tablet 1020 and portable media player 1030. The list of selectable devices 1000 can be populated in a number of different ways. In some embodiments, the list of selectable devices 1000 shows supplemental devices that have been previously paired with initiating device 110. In other embodiments, the list of selectable devices 1000 presents a list of supplemental devices with which initiating device 110 can currently pair. In the embodiment shown at FIG. 10b, the user may define an address (entered via OK button 1060) at which a supplemental device can receive a message from initiating portable electronic device 110. This address can be, for example, an email address having a mailbox at a supplemental device or a text message gateway (shown at Value 1050) for a phone number of a supplemental device. Values inputted by the user in this embodiment of FIG. 10b can populate the list of selectable devices 1000 shown at FIG. 10a. In an alternative embodiment, the list of selectable devices 1000 is populated through another method for defining commonly owned devices (e.g., those methods described above). In some embodiments, once the family of commonly owned devices has been established, this family of devices populates the list of available devices 910, via identifiers 920, 930, 940 shown at FIG. 9, which the user can select and confirm (via an OK button 950) at initiating device 110 such that the message (e.g., message 500 of FIG. 5) will be sent from initiating device 110 to those selected supplemental devices.

Figure 11:
FIG. 11 is a flow diagram illustrating one embodiment of the invention.

In an embodiment described at FIG. 11, the message (e.g., message 500 of FIG. 5) is not used to access a secure WLAN, but is instead used to access some protected content. Protected content can be content accessible at, for example, a website that requires login credentials (e.g., a user name and password), a website that requires an authentication certificate, an application that requires login or authentication and that resides in the memory of a portable electronic device, a web application that requires login or authentication running at a remote server, a web application that requires login or authentication wherein application data is downloaded to the portable electronic device, or any substantially similar method or system for accessing content through a password-protected or other similar authentication mechanism.

At operation 1101 of FIG. 11, the user enters his/her login credentials at an authentication mechanism presented at initiating portable electronic device 110. In the embodiment shown at FIG. 12, the user enters his/her username at username input field 1230 and password at password input field 1220 provided at a display of initiating device 110. In this embodiment, the authentication mechanism is a username and password input; however, other authentication mechanisms (e.g., security certificate) are comprehended by this Specification. Accordingly, at operation 1102 the protected content becomes accessible at initiating device 110 (e.g., the protected content can be presented at a display of initiating device 110) if the credentials inputted by the user to the authentication mechanism are valid.

Now, the user may also wish to access the protected content at another device in the user's family of commonly owned devices—such as supplemental device 150. To facilitate accessibility of the protected content at the supplemental device 150, a process in the initiating device 110 first prepares a message (e.g., message 500 of FIG. 5) that includes the credentials at operation 1103. In some embodiments, this message also includes an identification of the application, webpage (e.g., uniform resource locator), etc., having an authentication mechanism to receive the credentials.

Still referring to FIG. 11, at operation 1104, the initiating device 110 transmits the message to a supplemental device 150. Thus, the credentials to access the protected content are received at supplemental device 150, obviating repeated user entry of the same credentials into multiple devices to access the same protected content across those multiple devices. In the embodiment shown at FIG. 12, this message can be sent across WPAN 190, such as a Bluetooth network, from initiating device 110 to supplemental device 150. Thus, the credentials for accessing the protected content are received at supplemental device 150.

In some embodiments, the credentials will automatically populate at the authentication mechanism of supplemental device 150. For example in the embodiment shown at FIG. 12, the credentials from the received message (e.g., a username and password) automatically populate the respective username input field 1260 and password input field 1250 at supplemental device 150. In situations wherein the authentication mechanism is not in focus at supplemental device 150, a process running at supplemental device 150 can bring the authentication into focus (e.g., by launching an application, by navigating to a specific uniform resource locator, etc. and brining the authentication mechanism to the foreground of a display of supplemental device 150). It is understood that the message can be transmitted from initiating device 110 to supplemental device 150 over the air according to any of the methods described above, not just across a WPAN. Thus, initiating device 110 can transmit the message across cellular network 140, across Internet 130 through WLAN 120, or across WPAN 190. Accordingly, supplemental device 150 can receive the message from cellular network 140 or across WPAN 190. Analogous embodiments are described in more detail above. In some embodiments, supplemental device 150 may be connected to Internet 130 through WLAN 120 and therefore can receive the message across Internet 130 through WLAN 120.

Figure 12:
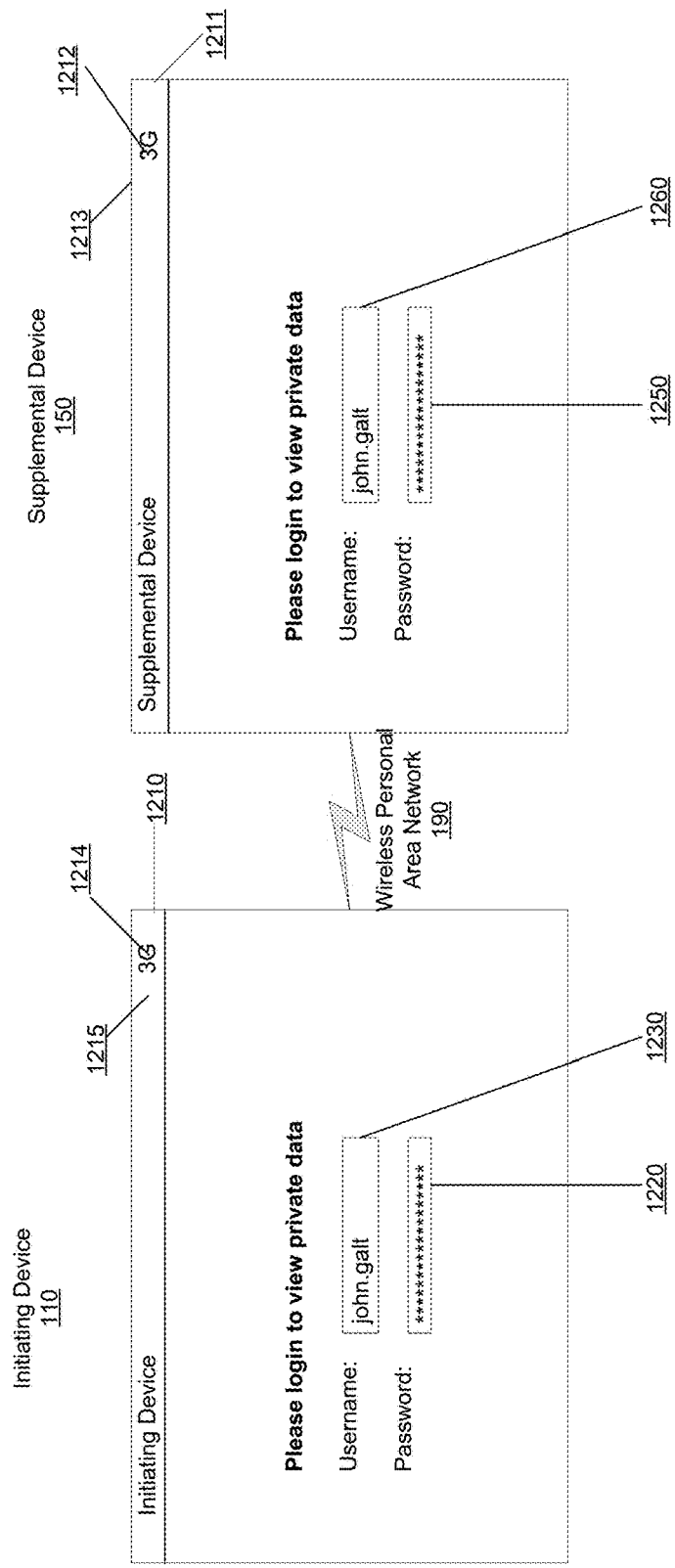
FIG. 12 is a block diagram illustrating displays at the initiating portable electronic device and the supplemental portable electronic device according to one embodiment of the invention.

Embodiments of the initiating device shown at FIG. 11 and FIG. 12 and described above can be implemented in a processor and associated memory, such as processor 700 and memory 701 as shown at FIG. 7. In such an embodiment, a user enters credentials to access protected content using manual input interface 770. The credentials are thus received at user interface module 710; user module 710 can distribute the credentials to other modules residing at memory 701. The protected content can be accessed through an authentication module at memory 701 (not shown). In some embodiments, the authentication module validates the user credentials (e.g., password) and then displays the protected content at display screen 771. Communications module 730 can receive these credentials from user interface module 710. Accordingly, communications module 730 prepares a message (e.g., message 500 at FIG. 5) containing the credentials. The embodiment of the message is dependent upon the particular method of transmission to be used by initiating device 110—e.g., in embodiments in which the message is transmitted across the Internet via a WLAN, the message is adapted to be distributed across the Internet.

Following message preparation by communications module 730 according to the embodiments wherein the message is transmitted across a WPAN, the message is transmitted by initiating device 110 through WPAN connection module 740 using WPAN transceiver 760. In one embodiment, WPAN connection module 740 is a Bluetooth module and WPAN transceiver 760 is a Bluetooth transceiver. In this embodiment, WPAN connection module 740 detects the presence of a pairing partner (e.g., supplemental device 150) and correspondingly pairs with the pairing partner; this function is executed prior to transmission of the message.

In one embodiment, WPAN connection module 740 verifies that the pairing partner (e.g., supplemental device 150) is adapted to accept message 500. This verification can be performed by transmitting a request using WPAN transceiver 760 to the pairing partner and receiving a response to the request or, alternatively, by receiving a response from the pairing partner without a request from initiating device 110. In such embodiments, initiating device 110 first pairs with the pairing partner and then performs message capability verification prior to transmitting message 500.

Following message preparation by communications module 730 and according to embodiments wherein the message is transmitted across the Internet, the message is transmitted by initiating device 110 through WLAN connection module 720 using WLAN transceiver 761 to WLAN 120 and then to Internet 130 for receipt at supplemental device 150. Various message formats according to this embodiment are described above.

Following message preparation by communications module 730 and according to the embodiments wherein the message is sent across a cellular network, the message is transmitted by initiating device 110 through cellular connection module 750 using cellular transceiver 762 to cellular network 140 for delivery to supplemental device 150. Various message formats according to this embodiment are described above.

According to another embodiment of the invention, the message is transmitted by point-to-point module 780 using point-to-point transceiver 763. Point-to-point transceiver 763 can transmit message over the air across a point-to-point network using near field communication.

Embodiments of supplemental device 150 according to the embodiments shown at FIG. 11 and FIG. 12 can be implemented in a processor and associated memory, such as processor 800 and memory 801 as shown at FIG. 8. In such embodiments, messaging module 810 is adapted to extract the credentials to access the protected content using those credentials. The protected content can be accessed through an authentication module at memory 801 (not shown). In some embodiments, the authentication module validates the user credentials (e.g., password) and then displays the protected content at display screen 871.

Figure 13:
FIG. 13 is a flow diagram illustrating one embodiment of the invention.
Figure 14:
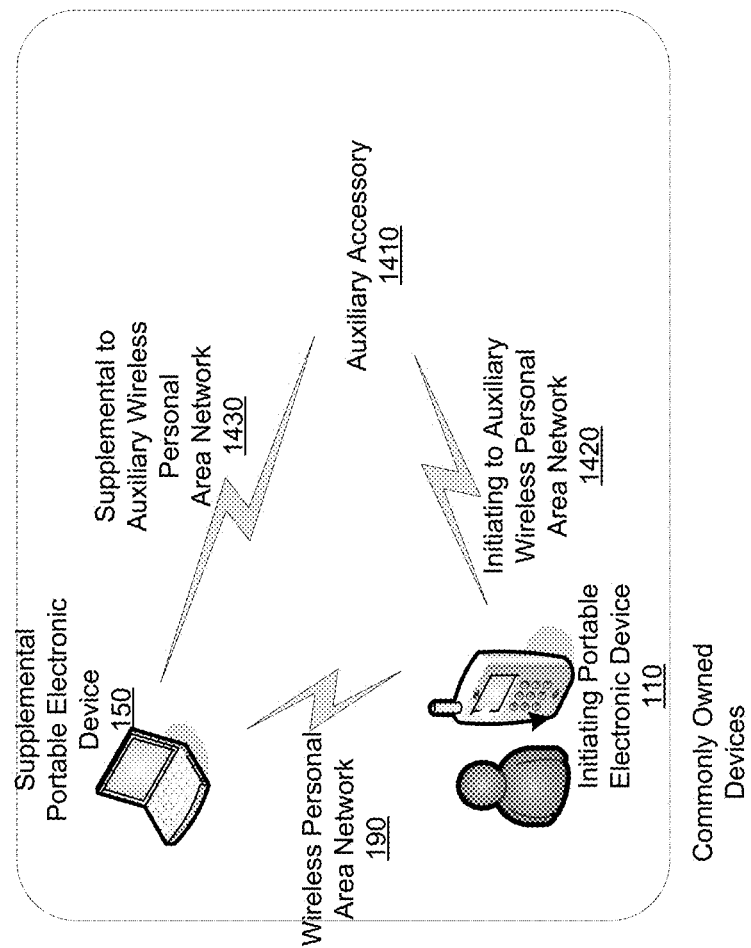
FIG. 14 is a block diagram illustrating wirelessly facilitating connecting to an auxiliary device by commonly owned devices according to one embodiment of the invention.

Turning to FIG. 13, an embodiment of the present invention is shown wherein the user desires to pair supplemental device 150 with an auxiliary accessory device, such as auxiliary device 1410 of FIG. 14. Auxiliary device 1410 can be any device capable of pairing with initiating device 110 and supplemental device 150. Preferably, auxiliary device 1410 will have a static passkey for pairing (e.g., "0000" or "1234") so that the passkey will be the same for both initiating device 110 and supplemental device 150. Auxiliary device 1410 can be, for example, a Bluetooth headset, Bluetooth headphones, a Bluetooth mouse, a Bluetooth keyboard or any other substantially similar peripheral device.

Still referring to FIG. 13, at operation 1301 the credentials to pair with auxiliary device 1410 are received at initiating device 110. In some embodiments, the credentials include receiving from the user at initiating device 110 a selection of an auxiliary device available for pairing. For example, initiating device 110 can present to the user a list of discoverable devices as a selectable menu at the display of initiating device 110. Upon selecting a discoverable device, initiating device 110 may present an input prompt to the user at the display prompting the user to enter the passkey for the selected discoverable device. In some embodiments, this selection of a discoverable device and a passkey for the discoverable device constitute the credentials. At operation 1302, initiating device 110 pairs with auxiliary device 1410 using the passkey inputted by the user at initiating device 110, creating Initiating to Auxiliary Wireless Personal Area Network 1420 as shown in the embodiment of FIG. 14.

To facilitate the pairing process between supplemental device 150 and auxiliary device 1410, initiating device 110 creates a message (e.g., message 500 of FIG. 5) to transmit to supplemental device 150. This message includes the credentials for pairing with auxiliary device 1410. In some embodiments, the credentials include the network address or other identifying information (e.g., a name) of auxiliary device 1410 so that supplemental device 150 has an indication for which discoverable device the passkey provided by initiating device 110 is to be used. Preferably, the credentials include at a minimum a passkey for pairing with auxiliary device 1410.

Still referring to FIG. 13, at operation 1304 initiating device 110 transmits the message to supplemental device 150. Thus, the credentials to pair with auxiliary device 1410 are received at supplemental device 150, obviating repeated user entry of the same credentials at different devices to pair with the same peripheral device. In the embodiment shown at FIG. 14, this message can be sent across a WPAN 190, such as a Bluetooth network, from initiating device 110 to supplemental device 150. Thus, the credentials for pairing with auxiliary device 1410 are received at supplemental device 150. It is understood that the message can be transmitted from initiating device 110 to supplemental device 150 over the air according to any of the methods described above, not just across a WPAN. Thus, initiating device 110 can transmit the message across cellular network 140, across Internet 130 through WLAN 120, or across WPAN 190. Accordingly, supplemental device 150 can receive the message from cellular network 140 or across WPAN 190. Analogous embodiments are described in more detail above. In some embodiments, supplemental device 150 may be connected to Internet 130 through WLAN 120 and therefore can receive the message across Internet 130 through WLAN 120. After receiving the credentials, supplemental device 150 can pair with auxiliary device 1410, creating Supplemental to Auxiliary Wireless Personal Area Network 1430.

Embodiments of the initiating device shown at FIG. 13 and FIG. 14 and described above can be implemented in a processor and associated memory, such as processor 700 and memory 701 as shown at FIG. 7. In such an embodiment, a user enters credentials to pair with auxiliary device 1410 using manual input interface 770. The credentials are thus received at user interface module 710; user module 710 can distribute the credentials to other modules residing at memory 701. Initiating device 110 can pair with auxiliary device 1410 using a pairing module at memory 701 (not shown); in some embodiments, this pairing module is included in WPAN connection module 740. Communications module 730 can receive these credentials from user interface module 710. Accordingly, communications module 730 prepares a message (e.g., message 500 at FIG. 5) containing the credentials. The embodiment of the message is dependent upon the particular method of transmission to be used by initiating device 110—e.g., in embodiments in which the message is transmitted across the Internet via a WLAN, the message is adapted to be distributed across the Internet.

Following message preparation by communications module 730 according to the embodiments wherein the message is transmitted across a WPAN, the message is transmitted by initiating device 110 through WPAN connection module 740 using WPAN transceiver 760. In one embodiment, WPAN connection module 740 is a Bluetooth module and WPAN transceiver 760 is a Bluetooth transceiver. In this embodiment, WPAN connection module 740 detects the presence of a pairing partner (e.g., supplemental device 150) and correspondingly pairs with the pairing partner; this function is executed prior to transmission of the message.

In one embodiment, WPAN connection module 740 verifies that the pairing partner (e.g., supplemental device 150) is adapted to accept message 500. This verification can be performed by transmitting a request using WPAN transceiver 760 to the pairing partner and receiving a response to the request or, alternatively, by receiving a response from the pairing partner without a request from initiating device 110.

In such embodiments, initiating device 110 first pairs with the pairing partner and then performs message capability verification prior to transmitting message 500.

Following message preparation by communications module 730 and according to embodiments wherein the message is transmitted across the Internet, the message is transmitted by initiating device 110 through WLAN connection module 720 using WLAN transceiver 761 to WLAN 120 and then to Internet 130 for receipt at supplemental device 150. Various message formats according to this embodiment are described above.

Following message preparation by communications module 730 and according to the embodiments wherein the message is transmitted across a cellular network, the message is transmitted by initiating device 110 through cellular connection module 750 using cellular transceiver 762 across cellular network 140 for delivery to supplemental device 150. Various message formats according to this embodiment are described above.

According to another embodiment of the invention, the message is transmitted by point-to-point module 780 using point-to-point transceiver 763. Point-to-point transceiver 763 can transmit message over the air across a point-to-point network using near field communication.

An apparatus comprising an article of manufacture in which a computer-readable medium has stored thereon instructions that program a first portable electronic device (a) to connect to a secure wireless local area network (WLAN) using a secret shared network key that is received by the device via user input, and (b) to transmit over the air to a second portable electronic device a service set identifier (SSID) of the WLAN and the network key. In one instance, (b) may be accomplished by transmitting over the air the SSID and the network key across the secure WLAN. In another instance, (b) may be accomplished by transmitting over the air the SSID and the network key across a wireless personal area network (WPAN). In yet another instance, (b) is accomplished by transmitting over the air the SSID and the network key across a point-to-point network. Also, the instructions may program the first portable electronic device to connect to the secure WLAN in response to user input that a) selects from amongst available broadcast WLAN SSIDs or provides a display name of a hidden WLAN SSID, and b) provides the secret shared network key.

An apparatus comprising: an article of manufacture having a computer-readable medium in which are stored instructions that program a portable electronic device to (a) receive over the air a message via a wireless network to which the portable electronic device is connected, wherein the message contains a service set identifier (SSID) of a secure wireless local area network (WLAN) and a network key of the secure WLAN; (b) extract, from the message, the SSID of the secure WLAN; (c) extract, from the message, the network key; (d) locate the secure WLAN using the extracted SSID; and (e) connect to the secure WLAN using the extracted network key.

A first portable electronic device having a processor and associated memory comprising: a user interface, the user interface to accept a service set identifier (SSID) and a network key; a WLAN connection module, the WLAN connection module to allow the first device to connect as a node to a secure wireless local area network (WLAN) having the SSID using the network key; a communications module, the communications module adapted to create a message for transmission over the air to a second device, the message including the SSID and the network key, wherein the message is adapted to provide the second device with the SSID and the network key for accessing the secure wireless local area network and further wherein the message is adapted to be transmitted over the air by the first device; and a connection module, the connection module adapted to transmit over the air the message created at the communications module. The connection module may be a WPAN connection module adapted to pair the first device with a second device and transmit the message across a WPAN. The connection module may alternatively be a cellular connection module adapted to transmit the message across one of a cellular voice network and a cellular data network. The WLAN connection module may also be the connection module, wherein the WLAN connection module is adapted to transmit the message across the secure wireless local area network. The connection module may be a point-to-point connection module adapted to transmit the message across a point-to-point network. The point-to-point connection module may be adapted to transmit the message using near field communication. The connection module can be adapted to send the message where the WPAN module has paired the first device with the second device.

A portable electronic device comprising: a connection module, the connection module allowing the device to connect to receive messages over the air at the device; a messaging module, the messaging module to process an incoming message received at the device; a wireless network module, the wireless network module allowing the device to connect to a secure wireless local area network using the received message; wherein the connection module is adapted to receive a message over the air, the messaging module is adapted to extract from the received message a service set identifier (SSID) and a network key for a secure wireless local area network (WLAN) having the SSID, and the wireless network module is adapted to connect to the secure WLAN having the SSID extracted from the received message using the extracted network key. The connection module can be a WPAN module adapted to receive the message across a WPAN. The connection module can alternatively be a point-to-point module adapted to receive the message across a point-to-point network.

A computer-implemented method comprising: receiving into a first portable electronic device credentials from a user, the credentials to include a passkey, and the credentials to allow the first device to pair with an auxiliary accessory device; using the credentials to pair the first device with the auxiliary accessory device; creating a message for wireless transmission, wherein the message includes the credentials for pairing with the auxiliary accessory device and an identification of the auxiliary accessory device and further wherein the message is adapted to be delivered to a second portable electronic device over the air; and transmitting the message over the air by the first device, wherein the message is addressed to the second device. The auxiliary accessory device may be one of a Bluetooth headset or Bluetooth headphones. The identification of the auxiliary accessory device may be a Bluetooth device address.

A computer-implemented method of a portable electronic device, comprising: receiving, by a portable electronic device, a message over the air, wherein the message contains credentials for pairing with an auxiliary accessory device; extracting, from the message, the credentials allowing the portable electronic device to pair with the auxiliary accessory device; identifying the auxiliary accessory device with which the portable electronic device can pair using the credentials; and pairing with the auxiliary device using the extracted credentials.

A first portable electronic device having a processor and associated memory comprising: a user interface, the user interface to accept a credentials at an authentication mechanism presented at the user interface; an authentication module, the authentication module to allow the first device to access protected content where the credentials are valid; a communications module, the communications module adapted to create a message for transmission over the air to a second device, the message including the credentials, wherein the message is adapted to provide the second device with credentials for accessing the protected content and further wherein the message is adapted to be transmitted over the air by the first device; and a connection module, the connection module adapted to transmit over the air the message created at the communications module.

A first portable electronic device having a processor and associated memory comprising: a user interface, the user interface to accept a credentials for pairing with an auxiliary accessory device; an WPAN module, the WPAN module to allow the first device pair with the auxiliary accessory device using the credentials; a communications module, the communications module adapted to create a message for transmission over the air to a second device, the message including the credentials, wherein the message is adapted to provide the second device with credentials for pairing with the auxiliary accessory device and further wherein the message is adapted to be transmitted over the air by the first device; and a connection module, the connection module adapted to transmit over the air the message created at the communications module.

Embodiments of supplemental device 150 according to the embodiments shown at FIG. 13 and FIG. 14 can be implemented in a processor and associated memory, such as processor 800 and memory 801 as shown at FIG. 8. In such embodiments, messaging module 810 is adapted to extract the credentials to pair with the auxiliary device using those credentials. Supplemental device 150 can pair with auxiliary device 1410 using a pairing module at memory 801 (not shown); in some embodiments, this pairing module is included in WPAN connection module 840.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures can be performed by processing logic that comprises hardware (e.g., circuitry, dedicated logic, etc.), software (e.g., embodied on a non-transitory computer readable medium), or a combination of both. Although the processes or methods are described above in terms of some sequential operations, it should be appreciated that some of the operations described can be performed in a different order. Moreover, some operations can be performed in parallel rather than sequentially.

Embodiments of the present invention are not described with reference to any particular programming language. It will be appreciated that a variety of programming languages can be used to implement the teachings of embodiments of the invention as described herein.

In this Specification, embodiments of the invention have been described with reference to specific embodiments thereof. It will be evident that various modifications can be made thereto without departing from the broader spirit and scope of the invention as set forth in the following claims. The Specification and drawings are, accordingly, to be regarded in an illustrative sense rather than a restrictive sense.

What is claimed is:

1. A computer-implemented method comprising:
    receiving into a first portable electronic device credentials from a user, the credentials to include a password, and the credentials to allow the first device to access protected content;
    using the credentials to access the protected content such that at least a portion of the protected content is displayed at the first device;
    creating a message, by the first device, for automatic wireless transmission, wherein the message includes the credentials including the password for accessing the protected content and an identification of the protected content accessible with the credentials and further wherein the message is adapted to be delivered to a second electronic device over the air, wherein the first and second devices are commonly owned by the user; and
    automatically transmitting the message over the air by the first device, wherein the message is addressed to the second device and is transmitted from the first device after using the credentials to access in the first device the protected content, wherein the message is not used by the second device to access any secure wireless local area network but is used to access the protected content accessed by the first device.

2. The method of claim 1, wherein the protected content is one of an application, a web site requiring login, or a web site requiring authentication.

3. The method of claim 1, wherein the message is transmitted over the air through one of a cellular network, a wireless local area network (WLAN), or a wireless personal area network (WPAN).

4. The method of claim 1, wherein the first portable electronic device and the second electronic device are in a family of commonly owned devices, wherein the method further comprises displaying a list of devices from which the user can select a device in the family of commonly owned devices to receive the message, wherein the message is transmitted to the second electronic device being the selected device.

5. The method of claim 4, wherein the list of devices are devices in the family of commonly owned devices that have been previously paired with the first portable electronic device.

6. The method of claim 1, wherein using the credentials to access the protected content comprises initiating an authentication mechanism of the protected content for authenticating the user through use of the credentials.

7. The method of claim 1, wherein the first portable electronic device and the second electronic device are in a list of commonly owned devices associated with the user.

8. The method of claim 7 further comprising:
    identifying a third device in the list of commonly owned devices for receiving the message from the second electronic device; and
    transmitting by the second electronic device the message to the third device, such that upon receipt of the message the third device becomes configured to use the credentials to access the protected content at the third device.

9. A first portable electronic device comprising:
a processor; and
memory having stored therein a user interface that when executed by the processor accepts a credential presented by a user wherein the credential includes a password and allows the first portable device to access protected content, an authentication module that when executed by the processor uses the credential to access the protected content, wherein at least a portion of the protected content is then displayed at the first portable electronic device, a communications module that when executed by the processor creates a message for automatic wireless transmission, wherein the message includes the credential including the password for accessing the protected content and an identification of the protected content that is accessible with the credential, and further wherein the message is adapted to be delivered to a second electronic device over the air, wherein the first and second devices are commonly owned by the user, and a connection module that when executed by the processor is adapted to cause the message to be automatically transmitted over the air by the first portable electronic device, wherein the message is addressed to the second device and is transmitted from the first device after using the credentials to access in the first device the protected content, wherein the message is not used by the second device to access any secure wireless local area network but is used to access the protected content accessed by the first device.

10. The first portable electronic device of claim 9 wherein the protected content is one of an application, a website requiring login, or a website requiring authentication.

11. The first portable electronic device of claim 9 wherein the connection module causes the message to be transmitted over the air through one of a cellular network, a wireless local area network, or a wireless personal area network.

12. The first portable electronic device of claim 9 wherein the first portable electronic device and the second electronic device are in a family of commonly owned devices, and wherein the user interface is to cause a list of devices to be displayed from which the user can select a device in the family of commonly owned devices to receive the message, and wherein the message is transmitted to the second electronic device being the selected device.

13. The first portable electronic device of claim 12 wherein the list of devices are devices in the family of commonly owned devices that have been previously paired with the first portable electronic device.

14. The first portable electronic device of claim 9 wherein the credential to access the protected content is used to initiate an authentication mechanism of the protected content for authenticating the user through use of the credential.

15. The first portable electronic device of claim 9 wherein the first portable electronic device and the second electronic device are in a list of commonly owned devices associated with the user, and wherein the list is stored in the memory of the first portable electronic device.

16. The first portable electronic device of claim 15 wherein the memory has stored therein instructions that when executed by the processor identify a third device in the list of commonly owned devices for receiving the message, and cause the second electronic device to transmit the message to the third device so that upon receipt of the message the third device becomes configured to use the credential to access the protected content at the third device.

* * * * *